United States Patent
Van Vliet et al.

(10) Patent No.: US 11,286,766 B2
(45) Date of Patent: Mar. 29, 2022

(54) SYSTEM AND METHOD FOR OPTIMIZING TUBULAR RUNNING OPERATIONS USING REAL-TIME MEASUREMENTS AND MODELLING

(71) Applicant: NOETIC TECHNOLOGIES INC., Edmonton (CA)

(72) Inventors: C. John Van Vliet, Calgary (CA); Spencer Taubner, Edmonton (CA); Victor Yung, Edmonton (CA); Daniel Dall'Acqua, Edmonton (CA)

(73) Assignee: Noetic Technologies Inc., Edmonton (CA)

( * ) Notice: Subject to any disclaimer, the term of this patent is extended or adjusted under 35 U.S.C. 154(b) by 0 days.

(21) Appl. No.: 16/640,884

(22) PCT Filed: Dec. 21, 2018

(86) PCT No.: PCT/CA2018/000241
§ 371 (c)(1),
(2) Date: Feb. 21, 2020

(87) PCT Pub. No.: WO2019/119107
PCT Pub. Date: Jun. 27, 2019

(65) Prior Publication Data
US 2020/0355063 A1 Nov. 12, 2020

Related U.S. Application Data

(60) Provisional application No. 62/664,147, filed on Apr. 28, 2018, provisional application No. 62/610,166, filed on Dec. 23, 2017.

(51) Int. Cl.
*E21B 47/007* (2012.01)
*E21B 47/07* (2012.01)
(Continued)

(52) U.S. Cl.
CPC ............ *E21B 47/007* (2020.05); *E21B 47/07* (2020.05); *G06F 17/40* (2013.01); *G06G 7/48* (2013.01)

(58) Field of Classification Search
CPC ........ E21B 17/00; E21B 47/007; E21B 47/07; G06F 17/40; G06F 30/20; G06G 7/48
See application file for complete search history.

(56) References Cited

U.S. PATENT DOCUMENTS

| | | | |
|---|---|---|---|
| 4,382,381 A | 5/1983 | Soeiinah | |
| 4,384,483 A | 5/1983 | Dellinger et al. | |

(Continued)

FOREIGN PATENT DOCUMENTS

| | | |
|---|---|---|
| CA | 2921155 A1 | 4/2015 |
| EP | 2902584 A2 | 8/2015 |

(Continued)

OTHER PUBLICATIONS

International Search Report re PCT/CA2018/000241, issued by the ISA/CA dated Mar. 19, 2019.

(Continued)

*Primary Examiner* — Elias Desta
(74) *Attorney, Agent, or Firm* — Donald V. Tomkins

(57) ABSTRACT

A system for optimizing a tubular running operation (TRO) in which a running string is disposed in a wellbore includes sensors located at the wellsite, plus one or more processors, displays, and user-input devices, which may be at the wellsite or elsewhere. The sensors are configured to measure running string parameters including the running strings position within the well, the running and rotation rates, and loads acting at the top of the running string. Based on this information, the processor(s) perform torque-and-drag analysis (TDA) in the top-down direction to estimate downhole loads on user-selected running string components, (Continued)

accounting for measurement and modelling uncertainties. Based on the estimated loads, the processor(s) calculate one or more damage indicators, which are communicated to the user via the display(s), enabling the user to take corrective action to prevent or manage damage to the running string.

20 Claims, 16 Drawing Sheets

(51) Int. Cl.
    *G06F 17/40*     (2006.01)
    *G06G 7/48*     (2006.01)

(56) References Cited

U.S. PATENT DOCUMENTS

| | | |
|---|---|---|
| 4,549,431 A | 10/1985 | Soeiinah |
| 4,675,147 A | 6/1987 | Schaefer et al. |
| 4,760,735 A | 8/1988 | Sheppard et al. |
| 4,791,998 A | 12/1988 | Hempkins et al. |
| 4,848,144 A | 7/1989 | Ho |
| 4,972,703 A | 11/1990 | Ho |
| 5,044,198 A * | 9/1991 | Ho .......... E21B 44/00 73/152.49 |
| 5,431,046 A | 7/1995 | Ho |
| 5,508,915 A | 4/1996 | Tsao et al. |
| 5,660,239 A | 8/1997 | Mueller |
| 5,844,132 A | 12/1998 | Fabret et al. |
| 5,852,235 A | 12/1998 | Pavone et al. |
| 6,026,912 A | 2/2000 | King et al. |
| 6,401,838 B1 | 6/2002 | Rezmer-Cooper |
| 6,443,242 B1 | 9/2002 | Newman et al. |
| 6,526,819 B2 | 3/2003 | Demarchos et al. |
| 7,188,058 B2 | 3/2007 | Hardy et al. |
| 7,412,368 B2 | 8/2008 | Mitchell |
| 8,191,221 B2 | 6/2012 | Suzuki et al. |
| 8,504,308 B2 | 8/2013 | Li et al. |
| 8,544,339 B2 | 10/2013 | McKee et al. |
| 8,708,052 B2 | 4/2014 | Radi |
| 8,752,648 B2 | 6/2014 | Goebel et al. |
| 8,855,933 B2 | 10/2014 | Mitchell |
| 8,875,366 B2 | 11/2014 | Suzuki et al. |
| 8,990,021 B2 | 3/2015 | Jeffryes |
| 9,022,140 B2 | 5/2015 | Marx et al. |
| 9,091,139 B2 | 7/2015 | Weng et al. |
| 9,103,736 B2 | 8/2015 | Chen et al. |
| 9,249,654 B2 | 2/2016 | Strachan et al. |
| 9,388,642 B2 | 7/2016 | Mangal et al. |
| 9,416,652 B2 | 8/2016 | Plotnikov et al. |
| 9,470,083 B2 | 10/2016 | Jaaskelainen |
| 9,593,568 B1 | 3/2017 | LeMonds et al. |
| 9,659,113 B2 | 5/2017 | Wicks et al. |
| 9,670,768 B2 | 6/2017 | Turner et al. |
| 9,696,198 B2 | 7/2017 | Turner et al. |
| 9,745,844 B2 | 8/2017 | Aniket et al. |
| 9,752,388 B2 | 9/2017 | Aniket et al. |
| 9,765,610 B2 | 9/2017 | Turner et al. |
| 9,797,234 B1 | 10/2017 | Forstner et al. |
| 9,822,629 B2 | 11/2017 | Suparman et al. |
| 9,835,021 B2 | 12/2017 | Samuel et al. |
| 9,845,671 B2 | 12/2017 | Kpetehoto et al. |
| 9,857,271 B2 | 1/2018 | Dashevskiy et al. |
| 9,909,410 B2 | 3/2018 | Mata |
| 9,932,813 B2 | 4/2018 | Haq et al. |
| 9,945,223 B2 | 4/2018 | Li et al. |
| 10,066,473 B2 | 9/2018 | Khare |
| 2005/0194185 A1 | 9/2005 | Gleitman |
| 2008/0308272 A1 | 12/2008 | Thomeer et al. |
| 2009/0192731 A1 | 7/2009 | De Jesus et al. |
| 2011/0186353 A1 | 8/2011 | Turner et al. |
| 2012/0143523 A1 | 6/2012 | Chen et al. |
| 2012/0143525 A1 | 6/2012 | Chen et al. |
| 2013/0144531 A1 | 6/2013 | Johnston |
| 2014/0207390 A1 | 7/2014 | Zheng et al. |
| 2014/0246238 A1 | 9/2014 | Abbassian et al. |
| 2014/0299378 A1 | 10/2014 | Abbassian et al. |
| 2014/0303894 A1 | 10/2014 | Abbassian et al. |
| 2014/0326449 A1 | 11/2014 | Samuel et al. |
| 2015/0012253 A1 | 1/2015 | O'Donnell et al. |
| 2015/0176237 A1 | 6/2015 | Li et al. |
| 2015/0361779 A1 | 12/2015 | Haq et al. |
| 2015/0369042 A1 | 12/2015 | Samuel et al. |
| 2016/0053605 A1* | 2/2016 | Abbassian .......... E21B 19/00 702/6 |
| 2016/0147918 A1* | 5/2016 | Samuel .......... E21B 17/10 703/2 |
| 2016/0203239 A1 | 7/2016 | Samuel et al. |
| 2016/0237804 A1 | 8/2016 | Papadimitriou et al. |
| 2016/0251954 A1 | 9/2016 | Samuel |
| 2016/0281489 A1 | 9/2016 | Dykstra et al. |
| 2016/0281490 A1 | 9/2016 | Samuel |
| 2016/0290123 A1 | 10/2016 | Samuel |
| 2016/0326844 A1 | 11/2016 | Samuel et al. |
| 2016/0326856 A1 | 11/2016 | Wise |
| 2016/0362973 A1 | 12/2016 | Turner et al. |
| 2016/0369614 A1 | 12/2016 | Turner et al. |
| 2017/0022798 A1 | 1/2017 | Samuel et al. |
| 2017/0098020 A1 | 4/2017 | Samuel et al. |
| 2017/0145810 A1 | 5/2017 | Deghuee et al. |
| 2017/0152736 A1 | 6/2017 | Kyllingstad |
| 2017/0152737 A1 | 6/2017 | Pons |
| 2017/0183953 A1 | 6/2017 | Harris et al. |
| 2017/0212505 A1 | 7/2017 | Revheim |
| 2017/0248004 A1 | 8/2017 | Garner et al. |
| 2017/0292362 A1 | 10/2017 | Aniket et al. |
| 2017/0298701 A1 | 10/2017 | DeBerry et al. |
| 2017/0306726 A1 | 10/2017 | Alzahrani et al. |
| 2017/0321534 A1 | 11/2017 | Stewart et al. |
| 2017/0350786 A1 | 12/2017 | Mitchell |
| 2017/0370203 A1 | 12/2017 | Hadi |
| 2017/0370204 A1 | 12/2017 | Dahl |
| 2018/0003024 A1 | 1/2018 | Khare |
| 2018/0003031 A1 | 1/2018 | Samuel |
| 2018/0024000 A1 | 1/2018 | Turner et al. |
| 2018/0025269 A1 | 1/2018 | Dursun et al. |
| 2018/0038215 A1 | 2/2018 | Badkoubeh et al. |
| 2018/0047191 A1 | 2/2018 | Priyadarshy |
| 2018/0073344 A1 | 3/2018 | Patterson et al. |
| 2018/0073347 A1 | 3/2018 | Aniket et al. |
| 2018/0080305 A1 | 3/2018 | Jacks et al. |
| 2018/0080850 A1 | 3/2018 | Rice et al. |
| 2018/0112512 A1 | 4/2018 | Chen et al. |
| 2018/0119534 A1 | 5/2018 | Jamison et al. |
| 2018/0119535 A1 | 5/2018 | Shen et al. |
| 2018/0137220 A1 | 5/2018 | Herbig et al. |
| 2018/0171773 A1 | 6/2018 | Nessjoen et al. |
| 2018/0171774 A1 | 6/2018 | Ringer et al. |
| 2018/0216412 A1 | 8/2018 | Samuel |
| 2018/0216443 A1 | 8/2018 | Williams et al. |
| 2018/0238164 A1 | 8/2018 | Jamison et al. |

FOREIGN PATENT DOCUMENTS

| | | |
|---|---|---|
| FR | 2842245 A1 | 1/2004 |
| GB | 2550192 A | 11/2017 |
| WO | 2016060684 A1 | 4/2016 |
| WO | 2016061171 A1 | 4/2016 |
| WO | 2016077239 A1 | 5/2016 |
| WO | 2016195706 A1 | 12/2016 |
| WO | 2017034587 A1 | 3/2017 |
| WO | 2017034588 A1 | 3/2017 |
| WO | 2017062024 A1 | 4/2017 |
| WO | 2017074380 A1 | 5/2017 |
| WO | 2017105411 A1 | 6/2017 |
| WO | 2017105430 A1 | 6/2017 |
| WO | 2017142540 A1 | 8/2017 |
| WO | 2017180124 A1 | 10/2017 |
| WO | 2017180157 A1 | 10/2017 |
| WO | 2017209607 A1 | 12/2017 |
| WO | 2017210379 A1 | 12/2017 |
| WO | 2018029454 A1 | 2/2018 |

(56) References Cited

FOREIGN PATENT DOCUMENTS

| WO | 2018038963 A1 | 3/2018 |
| WO | 2018106256 A1 | 6/2018 |
| WO | 2018112062 A1 | 6/2018 |

OTHER PUBLICATIONS

Tikhonov, V. et al., "Dynamic Model for Stiff String Torque and Drag"; SPE Drilling & Completion, (2013) 29. 10.211.

Written Opinion of the International Searching Authority re PCT/CA2018/000241, issued by the ISA/CA dated Mar. 19, 2019.

Formal Response to Written Opinion of ISA/CA re PCT/CA2018/000241, filed at IPEA/CA dated Oct. 23, 2019.

International Preliminary Report on Patentability (Chapter II), re PCT/CA2018/000241, issued by the IPEA/CA dated Jan. 30, 2020.

"Optimizing Liner Design and Installation with Dynamic Surface Load Limit Envelopes"; Suncor Energy and Noetic Engineering (2008) In., SPE Thermal Well Integrity and Design Symposium, Nov. 23-25, 2015, Banff, Alberta, Canada.

"Introduction to Real-Time Tubular Load Limit Monitoring System", Volant Products Inc., Nov. 18, 2016.

"Practical Considerations for Estimating Downhole Load Conditions in Real-Time"; Noetic Engineering, SPE Thermal Well Integrity and Design Symposium, Nov. 29-Dec. 1, 2016, Banff, Alberta, Canada.

Ex parte Kihachiro Okura—Patent Trial and Appeal Board Decision on Appeal #2020-002341, issued Jan. 29, 2021 (re U.S. Appl. No. 14/953,856).

Extended European Search Report re EP 18891614.2 (EP regional phase of PCT/CA2018/000241) dated Aug. 20, 2021.

Niedermayr et al.—"Case Study—Field Implementation of Automated Torque-and-Drag Monitoring for Maari Field Development"—IADC/SPE Drilling Conference and Exhibition, New Orleans, Louisiana, USA, Feb. 2-4, 2010 (IADC/SPE 128243-PP).

Patent Trial and Appeal Board Decision on Appeal #2020-004626, issued Oct. 20, 2020, re U.S. Appl. No. 15/202,378 (Moritz et al.).

*CosmoKey Solutions GMBH & Co.* v. *Duo Security LLC*, Court of Appeals for the Federal Circuit (Case 2020-2043), Oct. 4, 2021].

\* cited by examiner

SYSTEM AND METHOD FOR OPTIMIZING TUBULAR RUNNING OPERATIONS USING REAL-TIME MEASUREMENTS AND MODELLING

FIELD

The present disclosure relates in general to systems and methods for reducing or minimizing the duration of the tubular running operations for wells such as but not limited to oil or gas wells, and for extending the depth reachable by tubular strings during tubular running operations, while ensuring that stresses and strains imposed on the components of the tubular strings are maintained at acceptable levels during tubular running operations, and relates in particular to such systems and methods for use in association with deviated wellbores.

BACKGROUND

Deviated wells are commonly used in the extraction of hydrocarbons from subterranean formations. In contrast with vertical wells, deviated wells are intentionally drilled at an angle to the vertical along some or all of their length where advantageous to the hydrocarbon extraction process. Some deviated wells run horizontally through thin hydrocarbon-bearing formations in order to increase the contact area between the wells and the formation and, in turn, to increase the production rate that can be achieved from a single well. In other cases, a deviated well is used to access a hydrocarbon-bearing formation where restrictions, physical or regulatory, prevent the drilling of a vertical well from directly above the formation.

During the construction of a well, it is typical to install one or more tubulars in the well, for example, to provide the borehole with structural stability, or to control the flow of hydrocarbons. In this context, the term "tubular" may be understood to refer to any type of pipe, including pipe commonly known as casing, liner, or tubing. Tubulars arrive at the wellsite as individual lengths known as joints, typically 6 to 15 metres (20 to 50 feet) in length. The joints are run into the well one after the other, with each joint being connected to the one below by a threaded connection, to form a string. The string may be cemented in place within the well, suspended from another tubular string using specialized downhole equipment, or suspended from the wellhead. The process of running a string into a well, or otherwise manipulating the position of a string within a well, is referred to in this patent document as a "tubular running operation", and the string involved in a tubular running operation is referred to as a "running string".

In vertical wells, the primary forces acting on the running string during a tubular running operation are gravity (i.e., the weight of the running string itself) and buoyancy, which results from the running string displacing fluid within the well. In deviated wells, however, the running string experiences additional forces resulting from contact with the wellbore. For purposes of this patent disclosure, the term "wellbore" is to be understood as referring to any outer tubular string or open-hole section that encloses any part of the running string during a tubular running operation.

Contact forces between a wellbore and a running string are referred to as side load. Side load may result from the running string resting on the low side of the wellbore, from tension or compression pulling or pushing the running string to the side of a curved wellbore (the "capstan effect"), from the bending stiffness of the running string through a curved wellbore, from sinusoidal or helical buckling of the running string within the wellbore, or from other effects. If the running string is moving, or if applied forces are urging it to move, then frictional forces arise to resist the movement, or attempted movement, of the running string.

The ratio of the frictional force magnitude to the associated side load magnitude is typically termed the friction factor (conceptually analogous to the friction coefficient associated with contact between two surfaces). Different friction factors may apply for different running string components and wellbore types. Frictional forces may act in the axial direction (either uphole or downhole), in the rotational direction, or in some intermediate direction. More complex mechanisms or downhole conditions may also result in forces being applied to the running string. Examples include but are not limited to differential sticking, ledges, and obstructions.

During the installation of a tubular string in a deviated well, the frictional forces on the string act to impede its progress into the well. Without friction or other opposing forces, the full vertical weight of the running string would be suspended from the derrick of the drilling rig. To overcome friction, the driller must "slack off" or reduce the portion of the running string's weight supported by the derrick. If the running string is unable to advance into the well under its own weight, then the driller may use progressively more extreme measures to advance the string.

For example, the driller may set down the weight of rig equipment (such as a top drive) on the running string. Alternatively or additionally, a pull-down system may be employed to pull the top of the running string down. The running string may also be rotated to "break friction" so that the frictional forces are partially oriented in the rotational direction rather than purely in the axial direction. Regardless of the measures employed, the loads applied to the running string must be carefully managed to avoid overloading the components of the running string.

Every component in a running string has physical load limits beyond which the component will be damaged. The load limits may be expressed in terms of axial load (tension or compression), torque, side load, internal and/or external pressure, curvature, or some combination of these variables. The range of loads that can be safely applied to a component is defined by a load limit envelope, which in the most general sense is multi-dimensional shape considering all of the loads listed above. In practice, the load limit envelope is commonly expressed as a set of limit curves on a plot of axial load against torque, with each limit curve corresponding to a different curvature condition.

Additional sets of load limit envelopes may be specified to determine accumulated damage when a component is loaded cyclically. A component's load limit envelope may be described using equations, experimental data points, or analysis data points. A component may have multiple sub-components, each with its own load limit envelope. In such cases, the component load limit envelope is the combination of the sub-component load limit envelopes such that no sub-components are overloaded.

To facilitate the monitoring, management, and optimization of rig operations, modern drilling rigs are equipped with an array of sensors. On many rigs, the readings from the various sensors are fed to a central data acquisition system known as the electronic data recorder or electronic drilling recorder ("EDR"). Important measurements during tubular running include the block height, the insertion depth of the running string, the force and torque applied to the top of the running string, the running rate (i.e., axial velocity) and rotation rate of the running string, and the pressure, flow rate, density, and temperature of fluids in the well during the tubular running operation. In this context, the term "insertion depth" corresponds to the term "measured depth" as defined in the "Schlumberger Oilfield Glossary"—i.e., the length of the running string along its path (which will not correspond to a depth below ground except in vertical wells).

The axial load on the top of the running string is often inferred from the drilling rig hook load, which is commonly determined by measuring the tension in the deadline of the rig's hoisting system. Although this method is convenient, its accuracy is affected by friction in the hoisting system. Therefore, the axial load on the top of the running string is occasionally measured by placing a load cell directly above the string. Such a load cell is commonly packaged in a component called a torque-and-tension sub, which also contains instrumentation to measure the torque applied to the string. More commonly, the applied torque is inferred from the hydraulic or electric power supplied to the drilling rig top drive. The drilling rig's block height measurement is commonly used during tubular running to determine: (1) the running rate, based on the rate of change of the block height; and (2) the insertion depth, based on the cumulative block movement.

While the sensors on modern drilling rigs provide the crew with valuable information on the conditions at surface, direct measurements of downhole conditions are generally not available during tubular running. Downhole sensors are commonly used during drilling to measure such things as the azimuth and inclination of the wellbore, and the torque and axial load near the bit. Downhole sensors of this type can be used in one or more discrete locations during certain types of tubular running.

However, the cost of such sensors typically precludes their use in multiple locations or within any part of the running string left in the well, since the sensors would also be left in the well. Therefore, while it is simple to measure the torque and axial load applied to the top of the running string during a tubular running operation, it is not practically feasible to measure the torque and axial load applied to each component of the running string downhole. Without direct measurements, it is challenging to determine whether any particular component of the running string has been overloaded.

The challenges associated with drilling and completing deviated wells have spurred the development of an analysis method known as torque-and-drag analysis ("TDA"). TDA of a tubular running operation involves calculating the loads acting on discrete elements in the running string due to gravity, buoyancy, side loads, and frictional forces. Typically, TDA is performed in the bottom-up direction; i.e., load and rate boundary conditions are applied to the bottom of the running string, and TDA provides an estimate of the torque and axial load at surface.

For example, typical boundary conditions during tubular running would be zero load at the bottom of the running string while moving with prescribed running and rotation rates. Different types of torque-and-drag models are available, including "soft-string" models that neglect the bending stiffness of the pipe, and "stiff-string" models that account for bending stiffness to varying levels of technical rigour. TDA is most commonly performed prior to well construction while designing a well or planning drilling or tubular running operations. TDA may be supplemented with fluid flow models for estimating downhole pressures, rates, and temperatures of fluids in the well.

BRIEF SUMMARY OF THE DISCLOSURE

The present disclosure teaches embodiments of systems and methods for optimizing a tubular running operation (or "TRO"). For convenience, systems in accordance with the present disclosure are alternatively referred to as "TRO systems". In this disclosure, references to "optimizing" a tubular running operation are to be understood as meaning reducing or minimizing the duration of the tubular running operation and/or extending the depth reachable by the running string during a tubular running operation, while ensuring that stresses and strains imposed on the components of the running string are maintained at acceptable levels.

In basic embodiments, a TRO system comprises a plurality of sensors, one or more processors, one or more displays, and one or more devices for user input. The sensors are located at a wellsite. All other components may be located at the same wellsite or at one or more network-connected locations remote from the wellsite. The sensors are configured to take measurements indicating the position of the running string within the well, the running and rotation rates, and the loads acting at the top of the running string.

Based on this information, the processors perform TDA (torque-and-drag analysis) in the top-down direction to estimate the downhole loads on each component of the running string, accounting for measurement and modelling uncertainties. Based on the estimated loads, the processors calculate one or more damage indicators. The damage indicators are communicated to the user of the TRO system via the displays, enabling the user to take corrective action to manage the damage sustained by the running string. The measurements and calculations may be repeated periodically over the course of the tubular running operation to enable continuous optimization.

Generally speaking, the types of corrective actions that might be taken in response to damage indicators generated by the TRO system will depend on the specific circumstances of a given case. However, non-limiting examples of possible corrective actions could include:
  changing the axial load applied to the running string;
  changing the torque applied to the running string;
  changing the running rate;
  changing the rotation rate; adding a lubricant to the wellbore;
  adding centralizers to the running string; and/or
  pulling the running string out of the wellbore to perform wellbore cleaning.

In one embodiment of a TRO system in accordance with the present disclosure, the damage indicator is a composite surface load limit envelope that indicates the range of axial loads and torques that can be applied to the running string at surface while remaining within the load limit envelopes of all the components in the running string, and which may change dynamically during the tubular running operation. Other damage indicators that can be calculated and displayed by TRO systems include the fatigue damage accumulated by each component in the running string, and the wear experienced by the running string and/or wellbore.

Damage indicators may additionally or alternatively be calculated by a TRO system using estimated loads obtained by performing TDA in the bottom-up direction, based on assumptions for the running rate, rotation rate, and loads acting at the bottom of the running string. This approach enables prediction of future running conditions and allows the user to take preventative action in the event that unacceptable damage to the running string or wellbore is anticipated.

TRO systems in accordance with the present disclosure may be used for all types of tubular running operations, including but not limited to top drive tubular running (in which the tubular is gripped with a top drive tubular running tool) and conventional tubular running (in which the tubular is run into the well on elevators).

In addition to being applicable in real time during a tubular running operation, the capabilities of TRO systems in accordance with the present disclosure can be utilized while designing a well, planning a tubular running operation, or reviewing a tubular running operation that is ongoing or that has occurred in the past. TRO systems and associated methods in accordance with the present disclosure can also be extended or adapted to consider additional stages of the life of a well, including but not limited to cementing, completion, stimulation, start-up, production, and abandonment.

BRIEF DESCRIPTION OF THE DRAWINGS

Embodiments will now be described with reference to the accompanying Figures, in which numerical references denote like parts, and in which.

DETAILED DESCRIPTION

Figure 1:
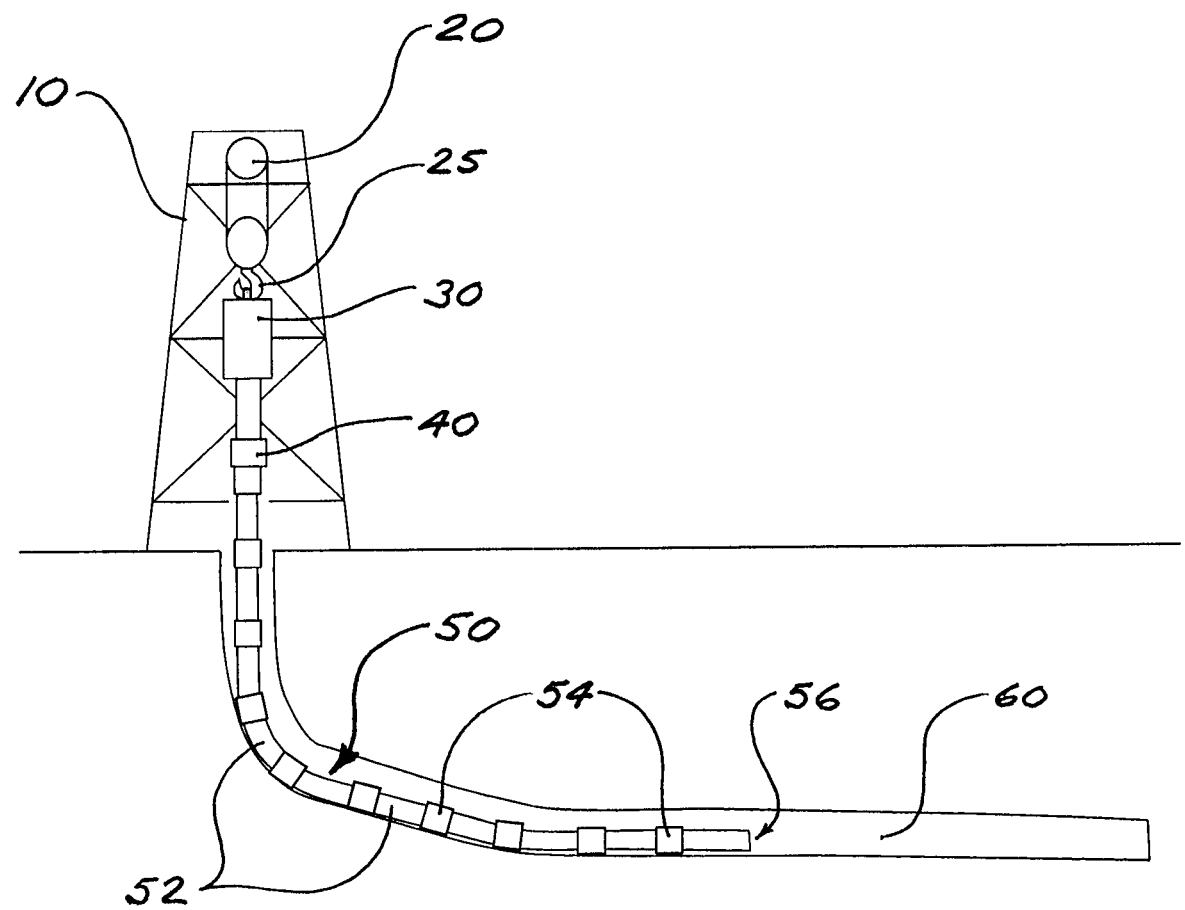
FIG. 1 is a simplified schematic elevation of a deviated well with a running string disposed in the wellbore.

FIG. 1 schematically illustrates a typical wellsite for a deviated well. A derrick 10 supports a block-and-tackle 20, which has a hook 25 from which a top drive 30 is suspended. A tool 40 for running tubulars into and out of the well (also referred to as a tubular running tool or a casing running tool, depending on the context) is mechanically connected to top drive 30. Tubular running tool 40 is used to manipulate a tubular string 50 (the running string) disposed within a wellbore 60 (as well as for "make-up" and "break-out" of running string 50 when it is being run into or out of the hole, respectively). Running string 50 is made up of tubular joints 52 connected end-to-end by threaded couplings 54.

A shoe, drill bit, or other downhole tool or device (not shown) will typically be connected to the bottom (or lower end) 56 of running string 50, depending on the nature and purpose of the particular tubular running operation (TRO) being conducted. As well, running string 50 may incorporate any of various types of "subs" or other components that are not shown in FIG. 1; accordingly, the components of a running string 50 are not limited to the tubular joins 52 and couplings 54.

Figure 2:
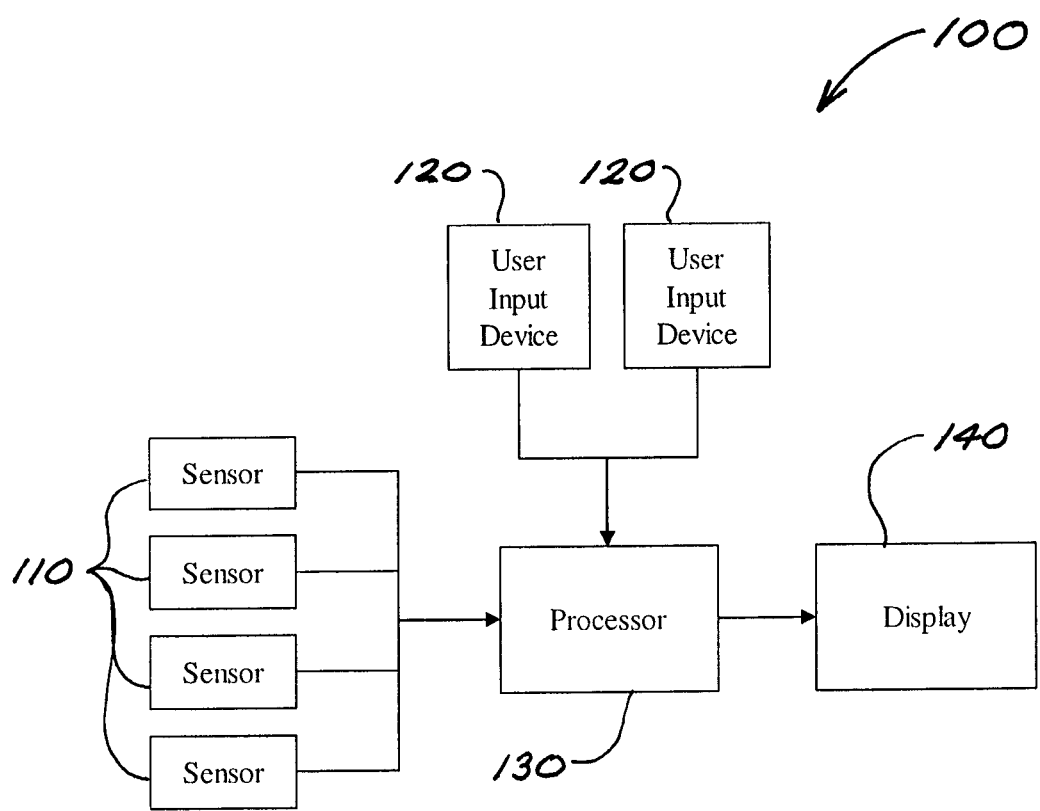
FIG. 2 is a block diagram schematically illustrating a basic embodiment of a TRO system in accordance with the present disclosure.

FIG. 2 schematically illustrates one basic embodiment 100 of a TRO system in accordance with the present disclosure. TRO system 100 includes:

a plurality of sensors;
one or more processors configured to receive measurements from the sensors and perform calculations ("processors");
one or more devices for user input ("user input devices"); and
one or more displays for configuring the system and showing the results of the calculations to the user of the TRO system ("displays").

Figure 3:
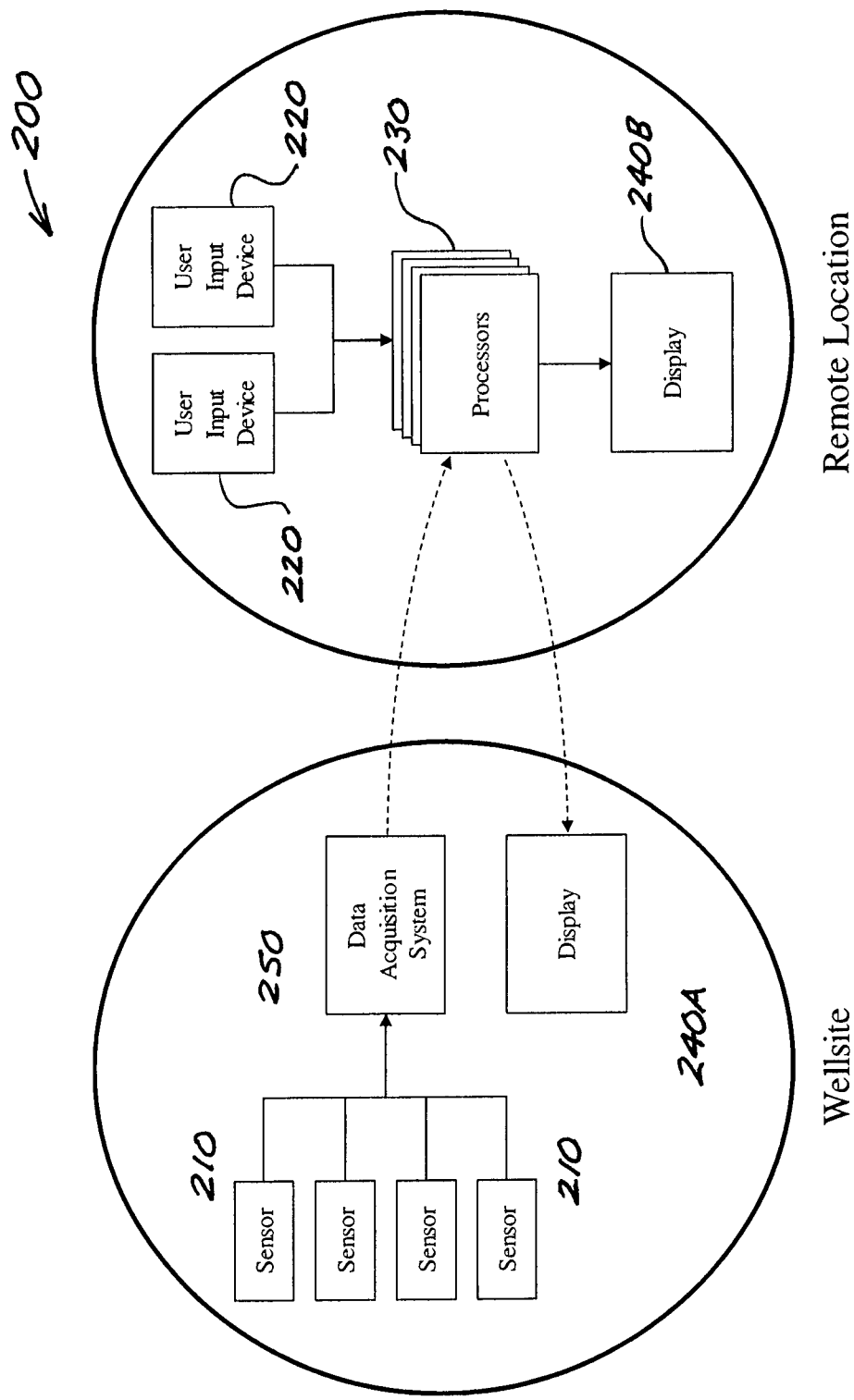
FIG. 3 is a block diagram schematically illustrating a variant of the TRO system in FIG. 2 in which the system's processors and user input devices are at a location remote from the wellsite and in communication with sensors and other components of the TRO system situated at the wellsite.

In alternative embodiments, individual processors, user input devices, and displays may be situated in different locations, separate from each other and separate from the sensors. An example of this may be seen in FIG. 3, which schematically illustrates a further embodiment 200 of a TRO system including:

a plurality of sensors 210 situated at a wellsite;
a data acquisition system 250 situated at the wellsite, and in electronic communication with sensors 210, for receiving data from sensors 210;
one or more displays 240A situated at the wellsite;
one or more processors 230 situated at a remote location, with processor(s) 230 being in electronic communication with data acquisition system 250 at the wellsite, and in electronic communication with display(s) 240A at the wellsite;
one or more user input devices 220 situated at the remote location, and in electronic communication with processor(s) 230; and
one or more displays 240B situated at the remote location and in electronic communication with processor(s) 230.

A TRO system may be part of a network with intermediate systems between the sensors, processors, user input devices, and/or displays. Measurements, results, inputs, and other data may be transmitted between sensors, processors, input devices, and displays using any data transmission or networking protocol and any wired or wireless connection. Examples include but are not limited to serial cables, radio transmissions, ethernet cables, internet protocols, and satellite or cellular networks.

In basic embodiments, TRO systems in accordance with the present disclosure include sensors configured to take measurements that can be used to determine the insertion depth of a running string in a well, the running rate, and the axial load acting on the top of the running string. These sensors will typically include a drilling rig hook load sensor (measurements from which can be used to determine the axial load on the top of the running string) and a drilling rig block height sensor (measurements from which can be used to determine both the running rate and the insertion depth), but other types and forms of sensors may also be used.

A TRO system for use in association with tubular running operations involving rotation of the running string will typically include sensors for measuring the rotation rate at the top of the running string and the torque acting on the top of the running string. Such sensors would typically take the form of top drive torque and rotation rate sensors, but other forms of sensors may be used.

Other types of sensors that can optionally be used to enhance the performance of a TRO system, but which are not required for performance of basic TRO system functionality, include:
- in tubular running operations using a pull-down system, a sensor to measure the pull-down force applied to the running string;
- a sensor for measuring the position of the drilling rig slips (which support the weight of the running string when a joint of pipe is being hoisted into the derrick);
- one or more sensors for measuring the axial load and/or torque at selected discrete downhole locations along the length of the running string; and
- One or more sensors for measuring fluid pressures, fluid flow rates, and/or fluid temperatures, which can influence the loads acting on the running string, as well as buckling response of the running string.

In one embodiment of a TRO system, the processors, displays, and user input devices form part of a computer system that is located at the wellsite. Additional components of the computer system can include, but are not limited to:
- storage media for storing the results of calculations performed by the processor;
- audio output devices; and
- general-purpose data communication connections, such as wired or wireless ethernet to internet allowing remote monitoring.

In one embodiment, a dedicated physical cable, such as a serial cable, can be used to connect the computer system to a rig-wide data acquisition system, which is in turn connected to the sensors. The connection between the computer system and the rig-wide data acquisition system can alternatively be made using a dedicated wireless connection or a general-purpose connection, such as wired or wireless ethernet. The computer system can alternatively be connected directly to the sensors.

In an alternative embodiment of a TRO system, the processors are at a location remote from the wellsite, the sensor measurements are transmitted from the wellsite to the processors, calculations are performed by the remote processors, and the results of the calculations performed by the processors are displayed at the wellsite and/or other location(s). Any method for transmitting data may be used, including but not limited to internet protocols over satellite, wireless, or wired networks.

User Inputs for Estimating Downhole Loads

To enable estimation of the loads on the running string, the user provides information about the drilling rig, wellbore, running string, and anticipated downhole conditions to the TRO system. The user can provide this information via input devices connected to the processors, such as a mouse and keyboard, whether the processors are located at the wellsite or remotely.

Information about the drilling rig is used by the TRO system to enable data acquisition from rig sensors, to model applied loads and rates on the running string, and to estimate uncertainties associated with all measurements. Examples of drilling rig information include the block weight; the sheave efficiency; and the accuracy and resolution of rig sensors. Examples of wellbore information include the well survey; the hole sizes and lengths; and the size, weight, length, and position of any tubulars already installed in the well. Examples of running string information include the sizes, weights, and lengths of components; connection information; and information about any additional components on the running string, such as centralizers. The TRO system uses wellbore and running string information along with information about the downhole conditions to perform TDA.

Based on the anticipated downhole conditions, the user can provide the TRO system with friction factors for different running string components and wellbore types. The user can additionally specify the uncertainty in those friction factors (for example, as a plus/minus percentage). Other examples of downhole condition information that can be provided to the TRO system by the user include but are not limited to the density and viscosity of fluids in the wellbore, hole erosion/washout, and additional wellbore curvature that is not included in the well survey (commonly referred to as tortuosity).

Typically, the user provides inputs to the TRO system in advance of the tubular running operation. However, the user may add or modify inputs at any time. For example, the user may modify the friction factor for a particular running string component in a particular wellbore type if it becomes apparent during the tubular running operation that the downhole conditions differ from expectations; or the user may provide an updated well survey if it becomes available during the tubular running operation.

User Inputs for Component Load Limit Envelopes

TRO systems in accordance with the present disclosure use information provided by the user to determine the load limits of each component in the running string based on the conditions at each component's current location in the well. This information can be provided in the form of load limit envelopes describing a locus of limiting axial loads, torques, and/or side loads; or as physical parameters that a TRO system uses to calculate load limit envelopes.

In one embodiment, the load limits of the running string components may be provided to a TRO system as load limit envelopes at different curvature magnitudes, since the load limits of a particular component generally depend on the curvature to which the component is subjected. The curvature magnitudes for which load limit envelopes are provided need not correspond to the curvatures indicated by the well survey, but instead may correspond to the curvature magnitudes considered when the load limits of the component were determined through analytical, numerical, experimental, or other means. The load limits of a component may additionally depend on the size of the wellbore into which the component is being run, as wellbore size will influence the tendency of the component to buckle under compressive axial load, so load limit envelopes may additionally be provided for different wellbore sizes.

The load limit envelopes for a component may be based on the elastic limit (i.e., yield strength) of that component, or any other selected criterion, and may include a safety factor (i.e., design margin) based on the user's risk tolerance.

Surface Loads and Rates

A TRO system in accordance with the present disclosure determines the loads and rates at the top of the running string based on sensor measurements. The TRO system considers the resolution and accuracy of the sensor measurements in subsequent calculations.

If the axial load sensor is located directly above the running string (e.g., in a torque-and-tension sub), then the sensor reading can be interpreted as the applied axial load at the top of the running string. When the axial load sensor is a deadline tension sensor, sheave friction in the block and tackle is considered when calculating the axial load applied at the top of the running string. When the block is moving up, the hook load is less than the deadline tension, and can be calculated using the following formula:

$$h = \eta \cdot \bar{h} = (1-\mu)\bar{h}$$

where h is the hook load;
$\bar{h}$ is the deadline tension;
$\eta$ is the sheave efficiency; and
$\mu$ is the sheave friction coefficient ($\mu = 1 - \eta$).

When the block is moving down, the hook load is more than the deadline tension, and can be calculated using the following formula:

$$h = (1+\mu)\bar{h}$$

The block weight is subtracted from the hook load to determine the axial load applied at the top of the running string. A negative result indicates that the top of the running string is in compression.

In tubular running operations involving rotation of the running string, positioning a torque sensor immediately above the running string (e.g., in a torque-and-tension sub) enables direct measurement of the applied torque at the top of the running string. If the drilling rig torque reading is inferred from the power of the top drive motor, then the torque at the top of the running string can be calculated based on the torque reading and an estimate of the mechanical losses through the power train connecting the top drive motor and running string.

The kinematics (i.e., running rate and rotation rate) of the running string are most commonly determined from the readings of a block height sensor and a rotation rate sensor. The running rate can be calculated based on the rate of change of the block height sensor reading, such as, for example, by taking the difference between two successive sensor readings and dividing that difference by the time that elapsed between the readings. The rotation rate of the running string is indicated directly by the rotation rate sensor.

Alternatively, the running rate can be determined by measuring the axial velocity of the running string directly, and the rotation rate can be determined from successive measurements of the angular orientation of the top of the running string. Regardless of the method of measurement, the TRO system considers the resolution and accuracy of the measurements in subsequent calculations. The TRO system may filter the running rate and rotation rate measurements by considering previous measurements and physical constraints on acceleration.

Downhole Loads

After determining the loads and rates at the top of the running string, the TRO system performs TDA to estimate the torque, axial load, and side load distribution along the length of the running string. In the following paragraphs, one exemplary method for estimating the downhole loads will be described for a demonstrative tubular running operation involving both axial and rotational motion of the running string. However, it will be appreciated by persons skilled in the art that the same method can be applied to the special case of a tubular running operation involving only axial motion of the running string.

In one approach, the running string is divided axially into a series of analysis elements; then, beginning at the top of the running string and working downwards, the incremental loads acting on each element (e.g., due to gravity, buoyancy, and friction between the running string and the wellbore) are evaluated and integrated. The number of analysis elements into which the running string is divided may be increased to improve the accuracy of the analysis results, or decreased to improve computational efficiency.

The boundary conditions of the TDA performed by the TRO system during tubular running are different from the boundary conditions for the typical TDA described earlier. Rather than using prescribed loads and rates at the bottom of the running string, the TRO system uses measured loads and rates at the top of the running string; that is, TDA is performed in the top-down direction instead of the bottom-up direction. It is beneficial to incorporate real-world measured conditions in this way, but the resulting load distributions calculated by the TRO system may be non-physical because of discrepancies between the torque-and-drag model and physical reality. That is, the calculated load distribution may be inconsistent with the kinematics of the running string.

Figure 4:
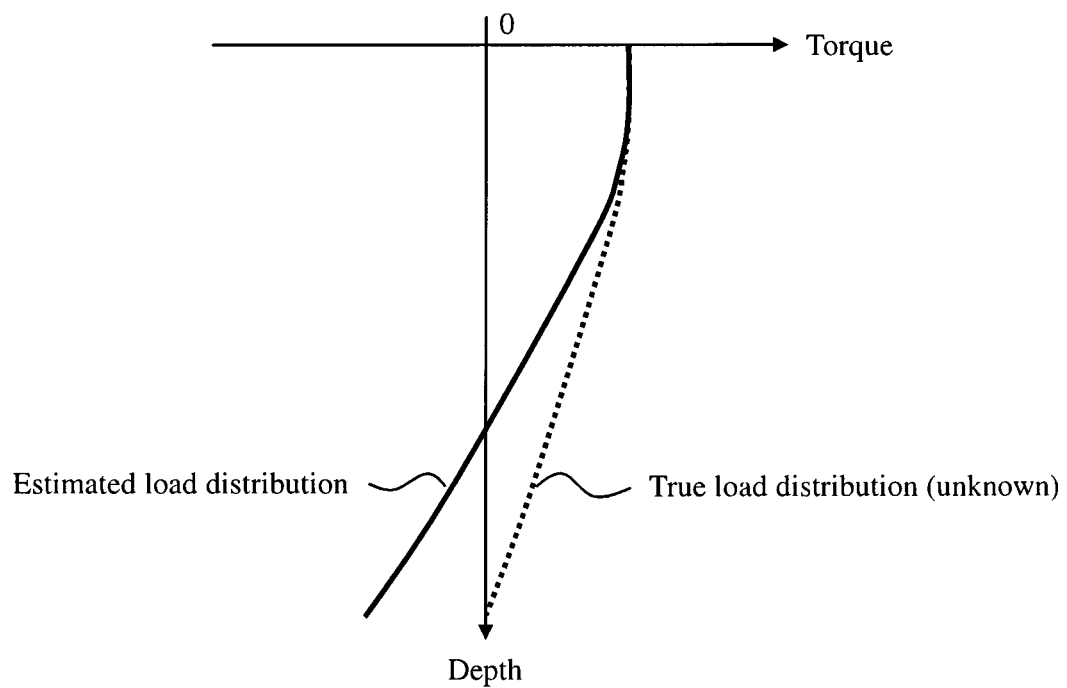
FIG. 4 is an illustration of true load distribution (unknown) and estimated load distribution.

For example, FIG. 4 shows the torque distribution obtained from TDA of the demonstrative tubular running operation at a point in time when the running string is rotating off bottom (i.e., rotating without axial motion or axial load at the bottom of the string). The friction along the length of the running string is over-estimated by the torque-and-drag model, leading to a change in the sign of the estimated torque (from positive to negative) at the bottom of the running string, which is a non-physical result.

Non-physical TDA results are useful for some purposes, so the TRO system considers two distinct running string load distributions: the virtual load distribution, and the consistent load distribution. As used in this specification, the term "virtual load distribution" refers to the estimated distribution of torque, axial load, and side load along the length of a running string as obtained from top-down torque-and-drag analysis without correction for non-physical results. The term "consistent load distribution" refers to a virtual load distribution from which all non-physical results have been eliminated.

Figure 5:
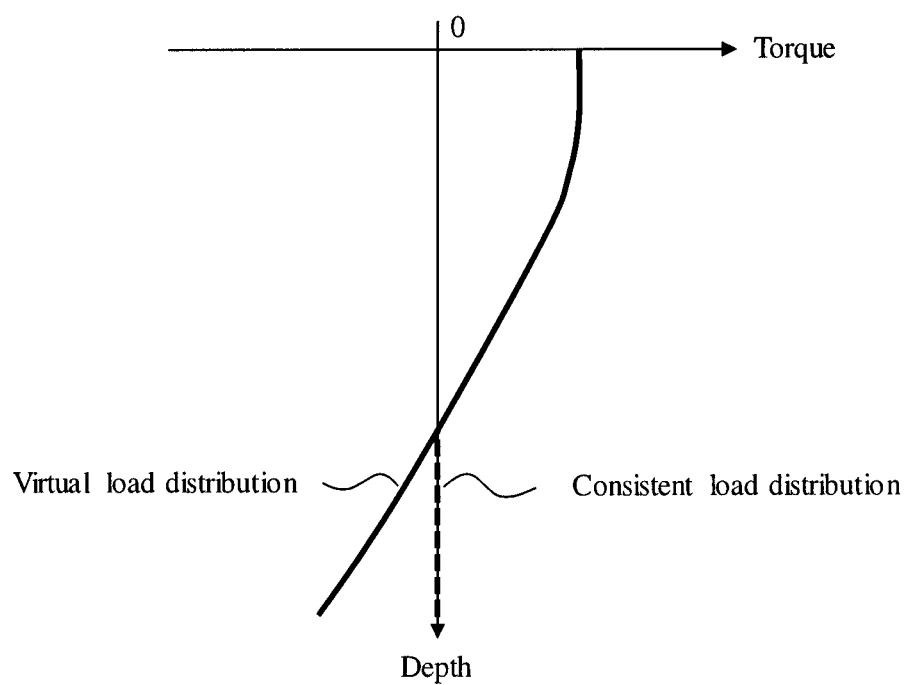
FIG. 5 is an illustrative example of virtual and consistent estimated load distributions.

FIG. 5 shows the virtual and consistent load distributions for the rotating-off-bottom operation previously discussed. The virtual and consistent load distributions are identical if there are no non-physical loads in the virtual load distribution. Non-physical loads are identified by comparing the applied load at any location to the running string kinematics.

Torque is considered non-physical if the sign of the torque opposes the rotation direction. Non-physical torque values are replaced with zero torque when constructing the consistent load distribution.

To determine whether an axial load at a particular location is non-physical, the TRO system first calculates the motive axial load, which is the applied axial load minus the hanging buoyed weight of the running string below the location of interest. That is, the motive axial load is the incremental load beyond what is required to hold the running string stationary against gravity. The axial load at a location is considered non-physical if the sign of the motive axial load opposes the direction of motion. A non-physical axial load at a particular location is replaced with the hanging buoyed weight of the running string below that location when constructing the consistent load distribution.

In an alternative embodiment, non-physical load determination can include running string inertia and compliance.

Local (Downhole) Load Limit Envelopes

The load limits of a given component of the running string at a given point in time depend on that component's location in the well and, more specifically, the local wellbore size and local wellbore curvature. Therefore, the TRO system calculates a local load limit envelope for each component in the running string based on the local wellbore size and local wellbore curvature at each component's current location in the well. This calculation may be performed by interpolating between or extrapolating from user-provided load limit envelopes, or using known calculation methods based on input parameters provided by the user.

Although the preceding discussion refers to analysis of each component of the running string, and similar references are made elsewhere in this disclosure, this is by way of non-limiting example only. There may be situations where it is readily apparent that some running string components will be susceptible to overstress or failure before other running string components, and in such cases the efficiency of the TRO system can be enhanced by analyzing only particular user-selected running string components, without compromising the practical effectiveness and utility of the system.

Surface Load Limit Envelopes

Comparison of the consistent load distribution with the local load limit envelope of any running string component at its current location provides an indication of the severity of the loading on that component. However, this comparison does not directly indicate the range of loads that can be applied at surface within the load limit envelope of all components of the running string. To be useful at surface, the downhole component load limit envelope must be transformed to a surface load limit envelope. As used in this specification, the term "surface load limit envelope" refers to the locus of surface loads at which the downhole loads on a given component of the running string will reach the component's local load limit envelope.

The TRO system transforms the local load limit envelope of each running string component into a surface load limit envelope that relates the load limit envelope of the component to the applied load at surface. Calculation of the surface load limit envelope for a given component of the running string requires an understanding of how changes in the load at surface will affect the load on that component. In general, this relationship is complex because changes in the load at surface will immediately affect forces on the running string, resulting from the capstan effect and/or buckling. Furthermore, changes to the applied loads will affect the kinematics (i.e., axial and rotational velocities) of the running string over time and, in turn, the direction of the frictional forces on the running string.

In preferred but optional embodiments, the TRO system assumes that the frictional forces on the running string are independent of incremental loads applied at surface for the purpose of calculating surface load limit envelopes. Given this assumption, a change in the load at surface results in an identical change in the load on any given component of the running string. As a consequence, a component's surface load limit envelope can be obtained through simple translation of its local load limit envelope.

Considering an arbitrary component i of the running string, the difference between the local load limit envelope and estimated load is termed the load buffer:

$$B_i = E_i - p_i$$

where $E_i$ is the local load limit envelope of component i;
$p_i$ is the estimated load on component i; and
$B_i$ is the load buffer of component i.

In the preceding equation, $p_i$ is a two-dimensional vector with components given by the torque and axial load estimated on component i using TDA:

$$p_i = \langle T_i, F_i \rangle$$

where $T_i$ is the torque on component i; and
$F_1$ is the axial load on component i.

$E_i$ may be expressed as a set of two-dimensional vectors (with torque and axial load components) that defines the local load limit envelope of component i at its current location in the well. In that case, $B_i$ would be a set of two-dimensional vectors representing the proximity of the estimated load on component i to its local load limit envelope.

Figure 6:
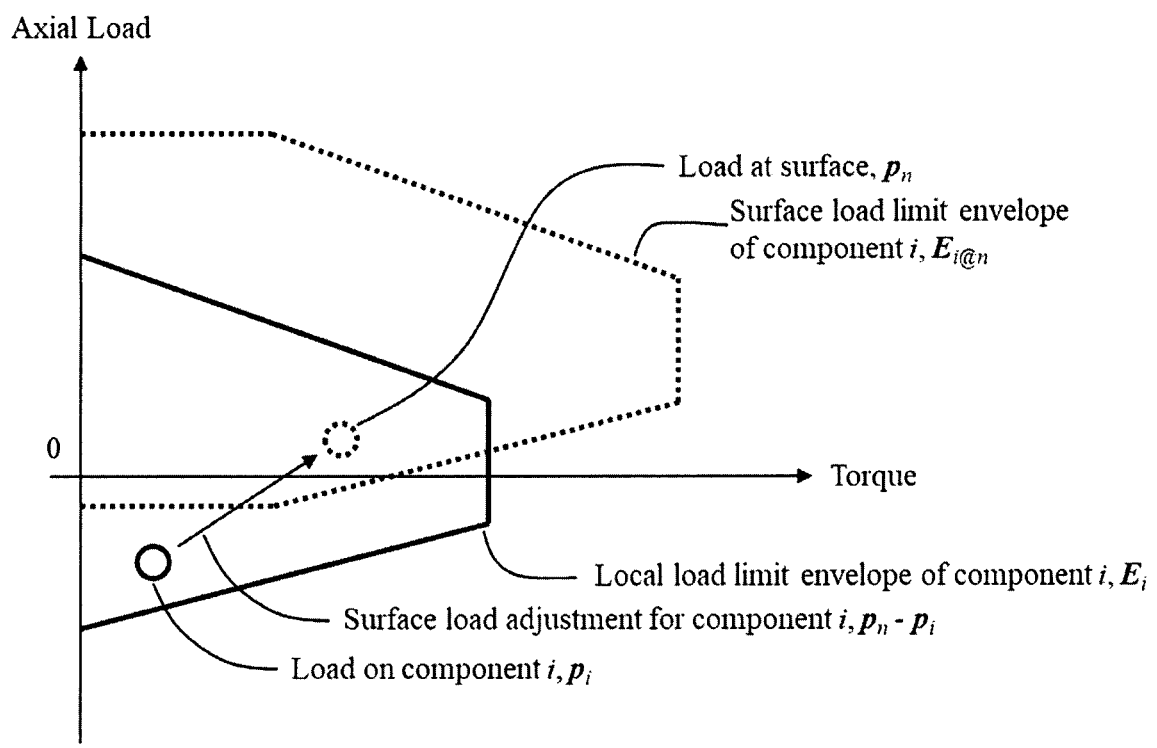
FIG. 6 illustrates a transformation of local load limit envelope to surface load limit envelope.

Since it is assumed that incremental loads at surface are the same as incremental loads on the component, the load buffer at the surface is the same as at the location of the component. The component load limit envelope can be transformed to the surface by applying the load buffer to the surface load as illustrated in FIG. 6 and described by the following equation:

$$E_{i@n} = p_n + B_i = E_i + (p_n - p_i)$$

where $E_{i@n}$ is the load limit envelope of component i transformed to surface;
$p_n$ is the load at surface; and
$(p_n - p_i)$ is termed the surface load adjustment.

In tubular running operations involving rotation of the running string, a component's local load limit envelope is translated along both the axial load axis (the vertical axis in FIG. 6) and the torque axis (the horizontal axis in FIG. 6) to obtain that component's surface load limit envelope. If this translation is in the negative torque direction (i.e., to the left in FIG. 6), the surface load limit envelope is truncated at the axial load axis. If this translation is in the positive torque direction (i.e., to the right in FIG. 6), it yields a load limit envelope that is not fully closed (i.e., it does not originate and terminate on the axial load axis).

To obtain a closed surface load limit envelope, the endpoints of the translated load limit envelope can be extended in the negative torque direction (i.e., horizontally to the left in FIG. 6) until the envelope is closed by the axial load axis. Physically, this extension of the surface load limit envelope corresponds to surface loading conditions under which no torque would be expected to reach the component in question, and, therefore, the component's zero-torque load limits would apply.

Either the virtual load distribution or the consistent load distribution may be used to estimate the load applied to element i ($p_i$). The virtual load distribution is preferred for the purpose of transforming downhole load limit envelopes to surface. The adjustments made to generate the consistent load distribution, as described earlier in this specification, would augment the surface load adjustment ($p_n - p_i$) and thereby be inconsistent with the assumption that a change in the load at surface results in an identical change in the load on any given component of the running string. Using the virtual load distribution makes the surface load limit envelope less sensitive to rapidly changing applied loads.

The method used to transform local load limit envelopes into surface load limit envelopes satisfies three objectives:
(1) the method does not require any calculations beyond simple translations of the local load limit envelopes, and, as a result, can be performed efficiently in real-time or for post-processing large volumes of data;

(2) the surface load limit envelope is insensitive to changes in the loads at surface, which makes it more stable and useful for the user; and (3) the surface load limit envelope will tend to expand as the applied loads increase in response to increasing rates in the direction of the applied load.

As used in this specification, the term "real time" (or "real-time") is to be understood as referring to a time interval for measuring and processing data and communicating results in a display that is short enough to enable effective corrective action during the tubular running operation. The relevant time interval for a given situation will depend on the specific damage indicator and corrective action. For example, a time interval of approximately one second might be required to adjust surface loads to prevent overloading downhole components, but a significantly longer time interval might be appropriate for adjusting tubular running plans to prevent excessive fatigue damage.

In alternative embodiments of TRO systems in accordance with the present disclosure, more complex relationships between incremental surface loads and downhole load distributions can be considered. The approach of translating downhole load limit envelopes using a surface load adjustment would not change, but the translation vector ($p_n$–$p_i$) would be different.

Composite Surface Load Limit Envelope

A tubular running operation can be optimized by applying surface loads that approach but do not exceed the load limits of the running string. That is, the load at surface must remain within the intersection of the surface load limit envelopes of all components (or all user-selected components, as the case may be) of the running string. This intersection, termed the "composite surface load limit envelope", is calculated by the TRO system and displayed to the user. Mathematically, the composite surface load limit envelope is defined as follows:

$$E_n = \bigcap_{i=0}^{n} [E_{i@n}] = \bigcap_{i=0}^{n} [E_i + (p_n - p_i)]$$

where $E_i$ is the local load limit envelope of component i;
$E_{i@n}$ is the surface load limit envelope of component i;
$E_n$ is the composite surface load limit envelope;
$p_i$ is the load on component i;
$p_n$ is the load at surface; and
$\bigcap$ is the intersection operator.

Figure 7:
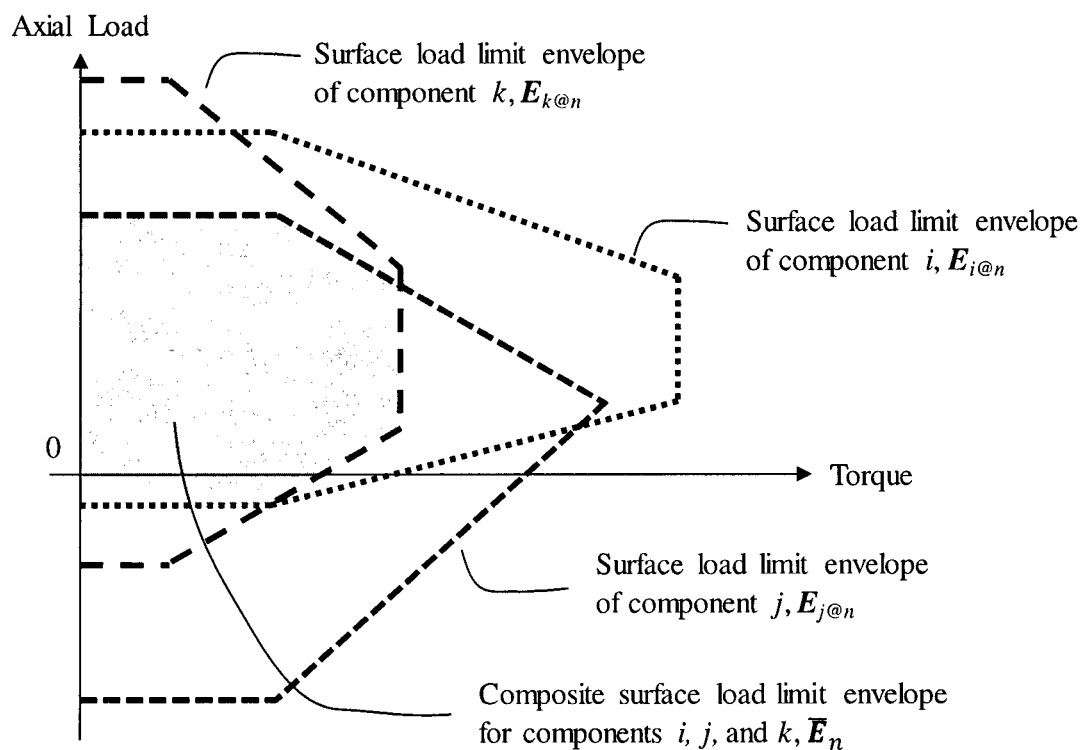
FIG. 7 illustrates combining component surface load limit envelopes into a composite surface load limit envelope.

This approach is illustrated in FIG. 7 for a running string with three components i, j, and k. The surface load limit envelopes of each component are overlaid, and the composite surface load limit envelope is defined by their intersection.

In an alternative embodiment where load and/or rate measurements are not available at a suitable frequency, or in the event of sensor failure, the TRO system may approximate the composite surface load limit envelope using load estimates obtained by performing TDA in the bottom-up direction, based on assumptions for the running rate, rotation rate, and loads acting at the bottom of the running string. In that case, the approaches for calculating the surface load limit envelope of an arbitrary component i and for calculating the composite surface load limit envelope are consistent with the approaches described above. However, $p_i$ is estimated using bottom-up TDA (instead of top-down TDA), and $p_n$ is likewise estimated using bottom-up TDA (instead of being determined from sensor measurements). Multiple sets of assumed running rates and rotation rates can be used to generate multiple composite surface load limit envelopes, which can be combined into a single visualization.

Uncertainty in Applied Loads

In the preceding discussion, the loads and rates at surface were treated as known, and the TDA was considered accurate for the purpose of describing the method employed by the TRO system to estimate downhole loads. In reality, there is uncertainty in the surface loads and rates associated with the accuracy and resolution of the sensors, and uncertainty in the downhole conditions (e.g., friction factors) and well model.

To address these measurement and modelling uncertainties, the TRO system repeats the top-down TDA using modelling and measurement inputs that describe the full range of downhole load distributions possible within uncertainties specified by the user. The load distribution calculated using nominal inputs and measurements is called the nominal load distribution and provides a nominal load estimate at each component i analyzed.

The full range of every measurement and modelling input can be considered, but may be computationally prohibitive. For this reason, one embodiment of the TRO system selects a subset of analysis inputs that will bracket the full range of downhole load distributions. For example, the load distribution with the maximum torque in the demonstrative tubular running operation introduced previously can be determined by maximizing the applied torque and minimizing the downhole torque lost to rotational friction, which is accomplished by combining low-end and high-end analysis inputs as follows: high-end torque measurement, high-end hook load (if running in), low-end rotation rate, high-end running rate, and low-end friction factors.

In one embodiment, the TRO system accounts for uncertainty in the applied loads by calculating one or more effective local load limit envelopes for each component in the running string based on each component's true local load limit envelope. As used in this specification, the term "true local load limit envelope" refers to a local load limit envelope that corresponds either to user-specified load limits, or load limits calculated by the TRO system based on user-specified parameters. The true local load limit envelope of a given component indicates that component's actual load limits at its current location in the wellbore. The term "effective local load limit envelope" refers to a true local load limit envelope that has been adjusted to account for uncertainty.

Figure 8:
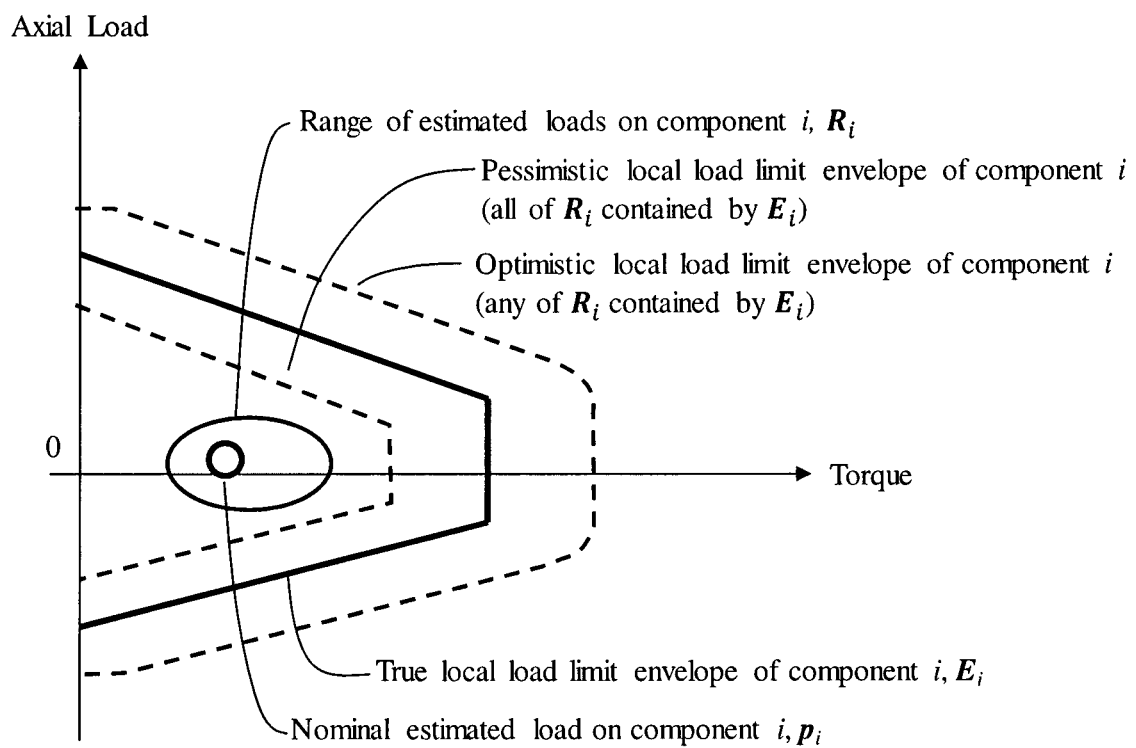
FIG. 8 illustrates modifying component load limit envelope to consider range of estimated loads applied to the component.

The approach for accounting for uncertainty used in one embodiment of the TRO System is illustrated in FIG. 8. Two types of effective local load limit envelope are calculated for each running string component i—namely, the "pessimistic local load limit envelope" and the "optimistic local load limit envelope"—although other types of effective local load limit envelope may also be considered. The pessimistic local load limit envelope provides effective load limits that are safe for worst-case loading, and is defined as the largest envelope that contains any nominal load estimate, $p_i$, such that the entire range of possible loads, $R_i$, is contained within the true local load limit envelope, $E_i$.

Conversely, the optimistic local load limit envelope provides effective load limits that are safe only for best-case loading, and is the smallest envelope that contains any nominal load estimate, $p_i$, such that the entire range of possible loads, $R_i$, is outside the true local load limit envelope, $E_i$. The pessimistic local load limit envelopes are transformed to surface and combined as described above to obtain a composite surface load limit envelope that is safe for worst-case loading. The optimistic local load limit envelopes are likewise transformed to surface and combined to obtain a second composite surface load limit envelope that is safe only for best-case loading.

In accordance with one TRO system embodiment, the user provides, for each analysis input, a nominal value and an uncertainty, expressed as a plus/minus percentage, and the TRO System calculates and displays two composite surface load limit envelopes, one corresponding to the nominal values for the analysis inputs, and the other representing a worst-case loading scenario based on the user-specified uncertainty in each analysis input, which corresponds to the pessimistic local load limit envelopes described above. In another embodiment, the TRO system additionally displays a composite surface load limit envelope representing a best-case loading scenario, which corresponds to the optimistic local load limit envelopes described above.

In another embodiment of the TRO system, the user assigns a probability distribution to one or more analysis inputs, and obtains a range of composite surface load limit envelopes that follow a corresponding probability distribution.

Real-Time Implementation

Figure 9:
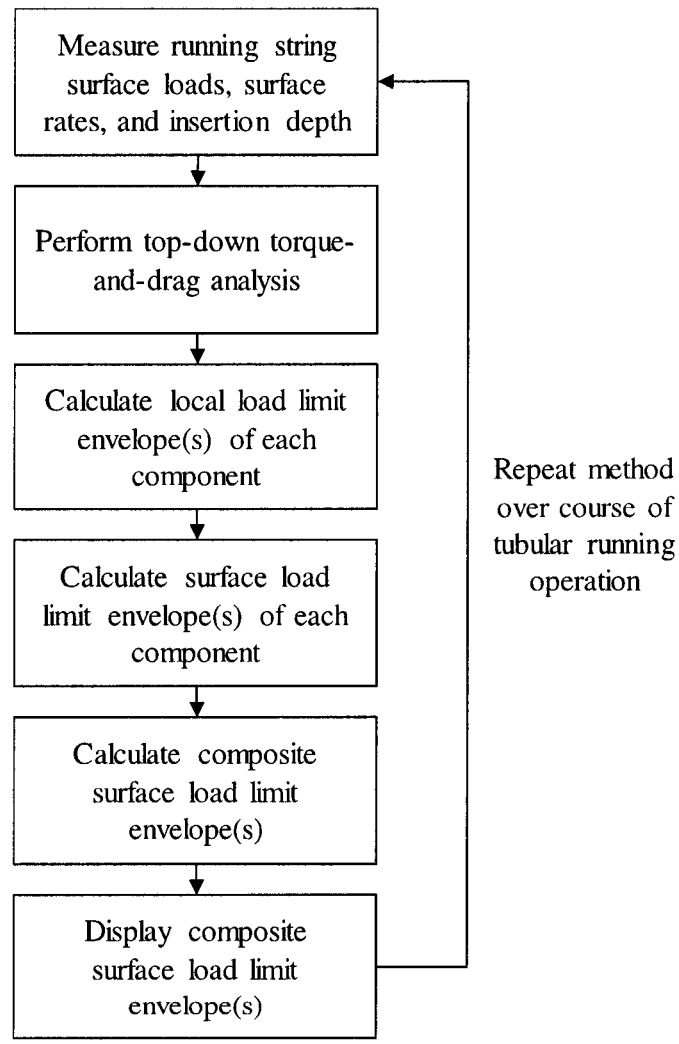
FIG. 9 is a flow chart summarizing one embodiment of method performed by TRO system.

The composite surface load limit envelope(s) obtained through the method described above will change in response to (1) changes in the running string kinematics, (2) changes in the applied loads at surface, (3) changes in the running string insertion depth since each component is in a new location, and (4) changes to user-provided inputs. Therefore, the method described above is repeated throughout the duration of the tubular running operation. The user may change the frequency with which the method is repeated either to improve the responsiveness of the composite surface load limit envelope(s) to changing running conditions or to reduce the computational burden. FIG. 9 shows a flow chart summarizing one embodiment of the method performed by the TRO system in which the method is repeated over the course of the tubular running operation.

In one embodiment, the TRO system repeats the method described above at a frequency on the order of 1 Hz (i.e., once per second), which testing has shown to provide a reasonable balance of accuracy and computational efficiency for tubular running operations of interest.

In another embodiment, the TRO system repeats the method described above in response to changes in running string kinematics, loads, running string insertion depth, or user-provided inputs; i.e., the calculations are only repeated when the inputs change.

Load Ratio

Figure 10:
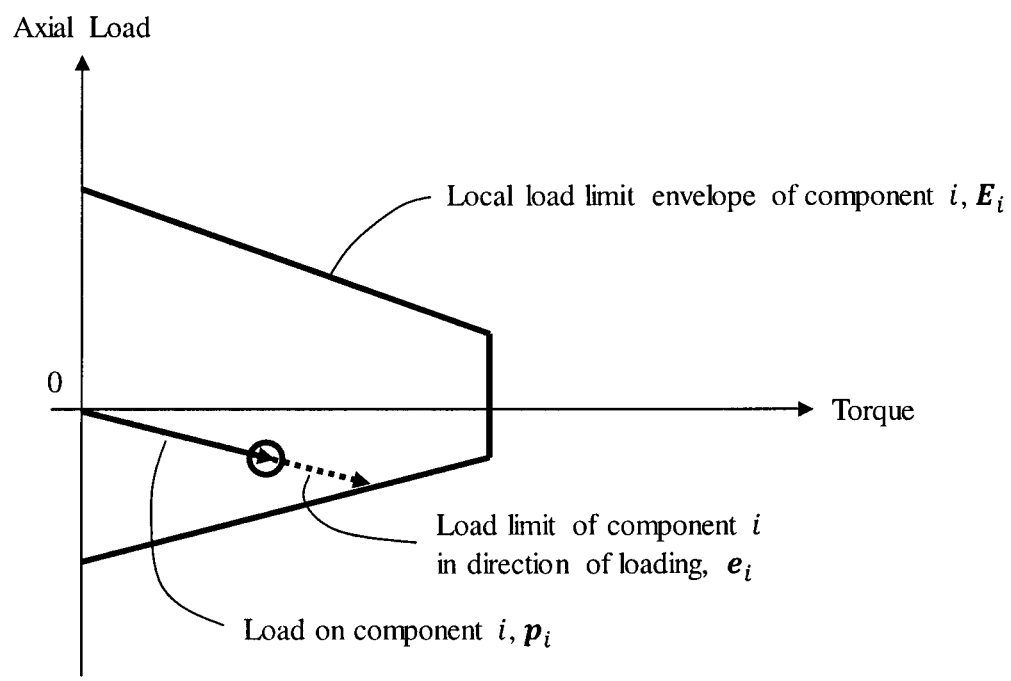
FIG. 10 illustrates calculation of component load ratio.

To provide the user with a record of the loading severity over the course of a tubular running operation, the TRO system can calculate the load ratio for each component of the running string at each point in time. In this context, "load ratio" is defined as the ratio of the vector magnitude of the load on a component to the component's load limit in the direction of loading. With reference to FIG. 10, load ratio is defined mathematically as follows:

$$\gamma_i = \frac{p_i}{e_i}$$

where $\gamma_i$ is the scalar load ratio for component i;
  $p_i$ is the load on component i;
  $e_i$ corresponds to a point on the load limit envelope $E_i$ for component i in the direction of loading.

Load ratio is a scalar value, which is calculated so that $$\frac{p_i}{\gamma_i}$$

is on the component load limit envelope $E_i$. There will not generally be an analytical solution for load ratio, so it will usually be calculated numerically. A load ratio of less than one indicates that the estimated load is less than the load limit; a load ratio of greater than one indicates an overload condition.

In one embodiment of the TRO system, nominal load measurements, rate measurements, and TDA inputs are used to calculate the load ratio for each component. The downhole load distribution is made physically consistent, as described earlier in this specification, for the purpose of calculating load ratios so that they have a sensible physical interpretation.

In another embodiment, a range of load ratios is calculated for each component in the running string at each point in time corresponding to the range of downhole load distributions possible within the measurement and modelling uncertainties specified by the user.

Prediction of Future Running Conditions

The preceding sections describe aspects of a method for determining whether the loads applied to the running string during a tubular running operation currently exceed or have exceeded specified load limits. The TRO system can also predict overload conditions before they occur. Advance notice of overload conditions allows the user to take preventative actions, including but not limited to adding a lubricant to the wellbore to reduce the drag forces on the running string, adding centralizers to mitigate downhole buckling, or pulling out the running string to perform additional wellbore cleaning.

A preceding section of the present disclosure described how the TRO system performs TDA in the top-down direction, using the loads measured at surface as boundary conditions, to estimate the load distribution along the running string at the current point in time. To estimate the running string load distribution at future points in time, TDA is performed in the bottom-up direction based on specified boundary conditions at the bottom of the running string. The specific steps are as follows:

Considering a future point in time when the running string is at an insertion depth some increment from its current insertion depth (below the current insertion depth if the running string is being run into the wellbore, or above the current insertion depth if the running string is being pulled out of the wellbore), the load distribution along the running string is analyzed using bottom-up TDA. The TDA is repeated for a range of running rate and rotation rate combinations, and for a range of friction factors corresponding to the uncertainties specified by the user.

Considering the same future insertion depth, the local load limit envelope of each running string component is determined.

The load distributions obtained through TDA are compared to the local load limit envelopes of the running string components. The TRO system alerts the user if the estimated loads exceed the local load limit envelope at any location along the running string.

The steps above are repeated for a range of insertion depths from the current insertion depth to the final insertion depth anticipated during the tubular running operation.

In preferred but optional embodiments, TDA is performed for "running in" (i.e., pure axial motion into the wellbore), "pulling out" (i.e., pure axial motion out of the wellbore), and pure rotation scenarios.

In one embodiment, the axial load and torque at the bottom of the running string are assumed to be zero for TDA. In another embodiment, a non-zero axial load and/or torque are imposed on the bottom of the running string (e.g., to account for contact between the running string and debris within the wellbore).

Figure 11:
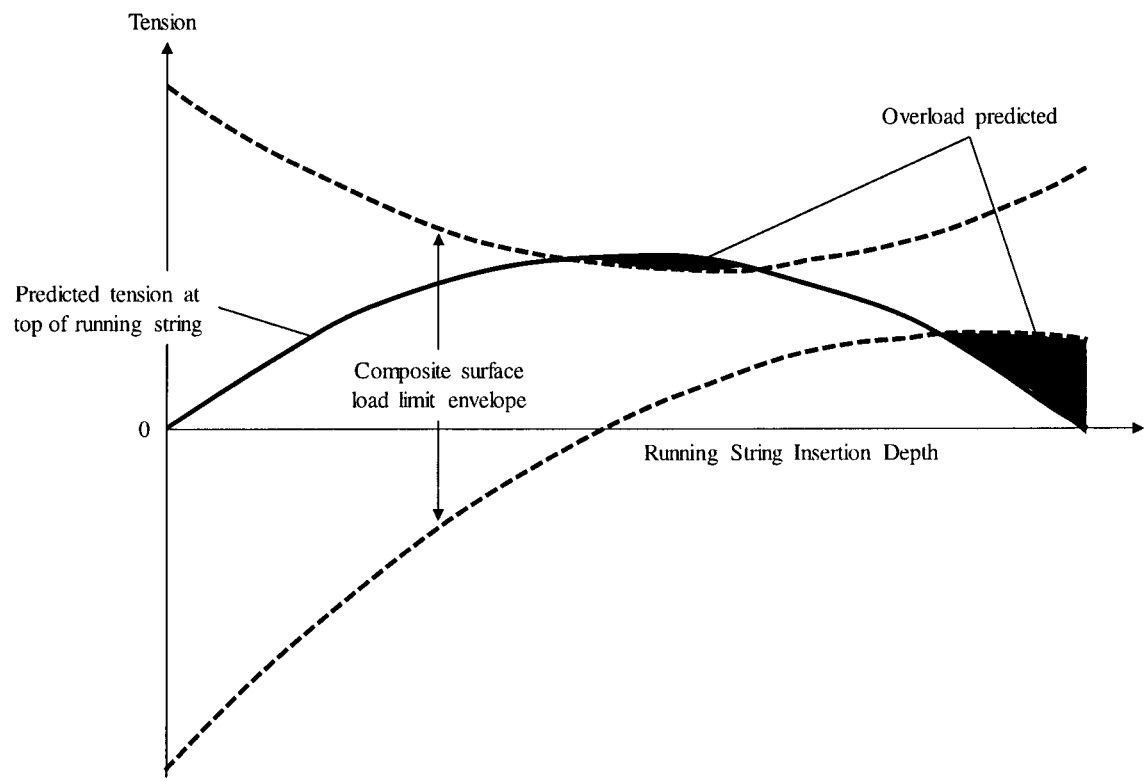
FIG. 11 is and illustrative example of a display indicating predicted overload conditions.

In a preferred but optional embodiment, the TRO system alerts the user to future overload conditions on a display that shows the predicted load at surface and the composite surface load limit envelope as functions of the running string insertion depth. An example of such a display is provided in FIG. 11 for a demonstrative tubular running operation in which the running string is being run into the wellbore without rotation. In this example, the predicted load at surface and the composite surface load limit envelope are expressed in terms of the tension at the top of the running string. However, the predicted load at surface and the composite surface load limit envelope could alternatively be expressed in terms of the hook load, where the hook load is equal to the tension at the top of the running string plus the drilling rig block weight. The predicted load at surface and the composite surface load limit envelope could additionally be expressed in terms of the torque at the top of the running string for scenarios involving rotation. The key features of the display are as follows:

- The display shows the load at surface predicted using TDA as a function of the running string insertion depth. The predicted load at surface is shown for the nominal friction factors specified by the user. In this example, the predicted load at surface is expressed in terms of the tension at the top of the running string; however, it could similarly be expressed in terms of the hook load, or in terms of the torque at the top of the running string for scenarios involving rotation.
- The display shows the composite surface load limit envelope, calculated as described earlier in this specification, as a function of the running string insertion depth. On a plot of the tension at the top of the running string versus the running string insertion depth, the composite surface load limit envelope reduces to a band defined by an upper (i.e., more tensile) load limit and a lower (i.e., less tensile) load limit. The composite surface load limit envelope would appear as a similar band on a plot of hook load versus running string insertion depth, and as a band defined by an upper torque limit and a lower torque limit on a plot of the torque at the top of the running string versus the running string insertion depth.
- Intervals where the predicted load at surface exits the composite surface load limit envelope indicate predicted overload conditions. Conspicuous colouring and/or shading can be used to alert the user to these intervals.

Figure 12:
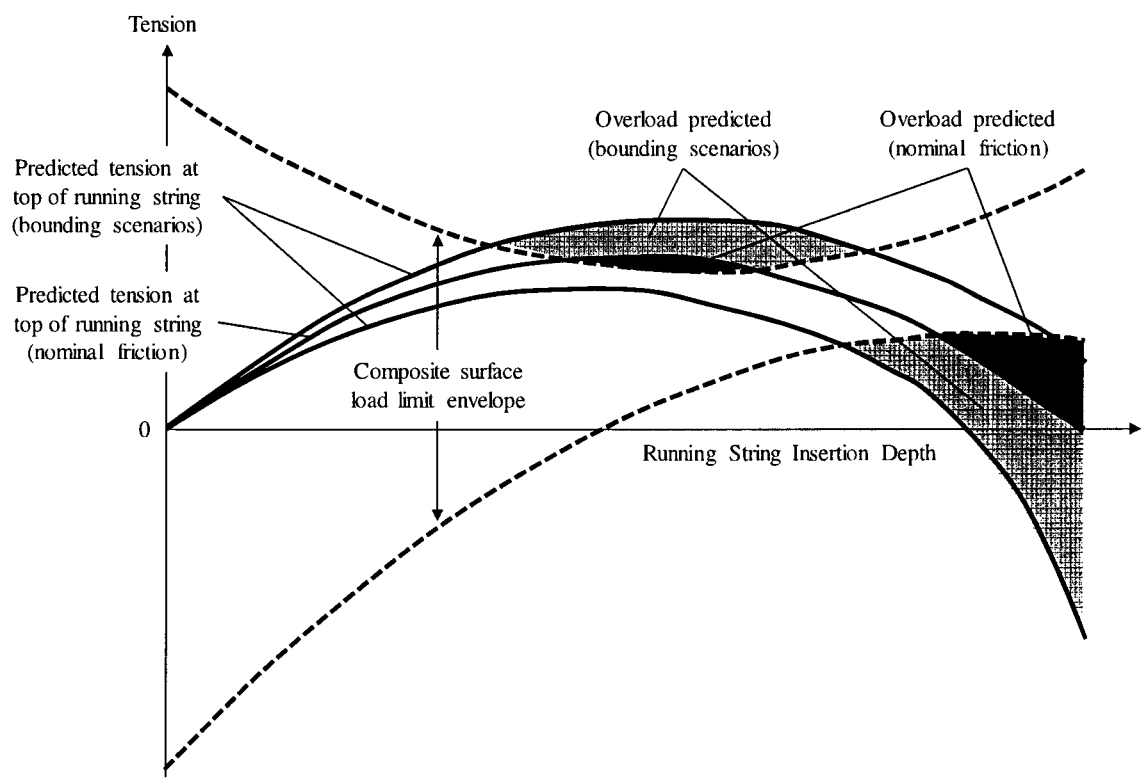
FIG. 12 illustrates an alternative embodiment of a display indicating predicted overload conditions.

In the preceding example, the display shows the predicted load at surface for a single set of TDA parameters. However, the display may show alternative or additional predictions based on alternative analysis parameters, such as different running rates, rotation rates, or downhole friction factors. FIG. 12 provides an example of a display for the same demonstrative tubular running operation that shows the predicted load at surface based on the nominal friction factors, as well as the predicted load at surface for two bounding scenarios within the uncertainties specified by the user, with one scenario giving the highest (in this example, most tensile) load at surface, and with the other scenario giving the lowest (in this example, least tensile) load at surface.

Torque-and-Drag Model Calibration

It is difficult to fully anticipate the conditions that will be encountered downhole during a tubular running operation. Therefore, in addition to accounting for uncertainty in the manner described earlier in this specification, the TRO system provides the user with facilities for calibrating the torque-and-drag model over the course of a tubular running operation based on the data collected.

The conventional approach to calibrating a torque-and-drag model based on measured data is to plot the measured and predicted loads at surface against the running string insertion depth. The load at surface may be expressed as the hook load, the tension at the top of the running string, or, in cases involving rotation, the torque at the top of the running string. Agreement between the measured and predicted loads over the course of the tubular running operation typically indicates that the parameters of the torque-and-drag model are appropriate; disagreement typically indicates that one or more aspects of the torque-and-drag model require calibration, although disagreement between measured and predicted loads can also result from measurement error.

Figure 13:
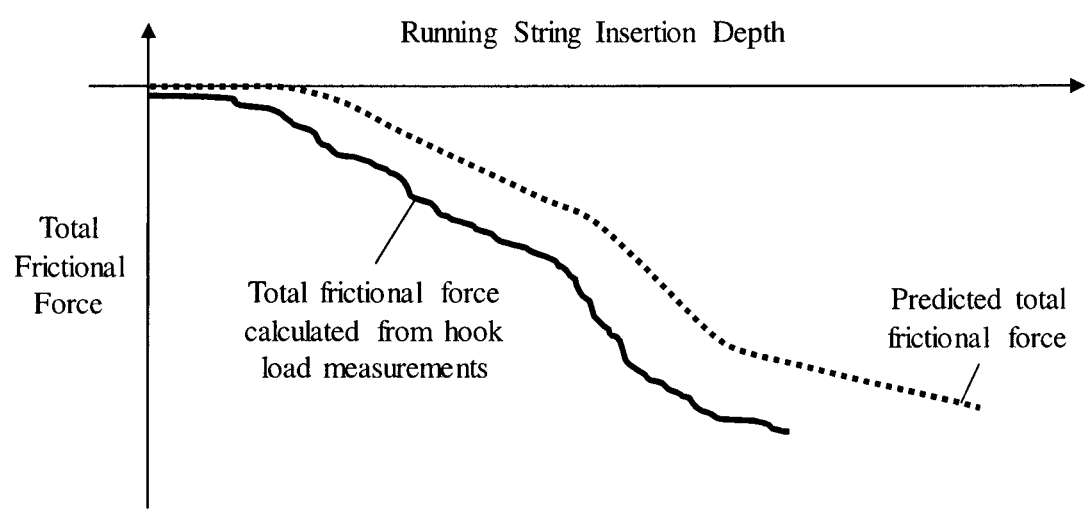
FIG. 13 is an illustrative example of a display indicating total frictional force on a running string.

While this calibration approach can be effective, it can be challenging to interpret plots of the hook load (or tension at the top of the running string), because the hook load depends not only on the frictional forces on the running string, but also on the weight and buoyancy of the running string. Therefore, in one embodiment, the TRO system includes an alternative display that shows the total frictional force on the running string as a function of the running string insertion depth, where the total frictional force is calculated as the hook load minus the sum of the block weight and the buoyed weight of the running string (or, equivalently, the tension at the top of the running string minus the buoyed weight of the running string). FIG. 13 shows an example of such a display for a demonstrative tubular running operation in which the running string is being run into the wellbore without rotation. The display shows the total frictional force on the running string up to the current point in the tubular running operation, as calculated from the hook load measurements, as well as the total frictional force predicted by TDA. For clarity, only a single prediction for the total frictional force on the running string is shown in the current example; however, the full range of predictions possible within the modelling uncertainties specified by the user can also be shown.

The display offers several advantages over a conventional plot of hook load, as follows:

- The display provides the user with a direct indication of the magnitude of the frictional force on the running string; there is no need for the user to differentiate between the effects of friction and the effects of pipe weight or buoyancy.
- Changes in the friction conditions as the running string moves along the wellbore (e.g., due to the running string entering a new section of the wellbore, or due to the running string impacting debris in the wellbore) are indicated directly by a change in the slope of the total frictional force curve.
- Certain errors in the torque-and-drag model are readily detectable, as is error in the hook load measurement.

For example, the frictional force on the running string is expected to be zero at the start of a tubular running operation (i.e., at an insertion depth of zero). A non-zero frictional force can indicate that there is an inconsistency between the block weight assumed in the torque-and-drag model and the true block weight of the drilling rig, or it can indicate error in the hook load measurement. Similarly, the frictional force on the running string is typically expected to be negligible in vertical wellbores having low tortuosity. In such wellbores, a non-zero frictional force and/or a change in the frictional force with insertion depth can indicate error in the block weight, pipe weight, or mud weight assumed in the torque-and-drag model, or error in the hook load measurement.

Figure 14:
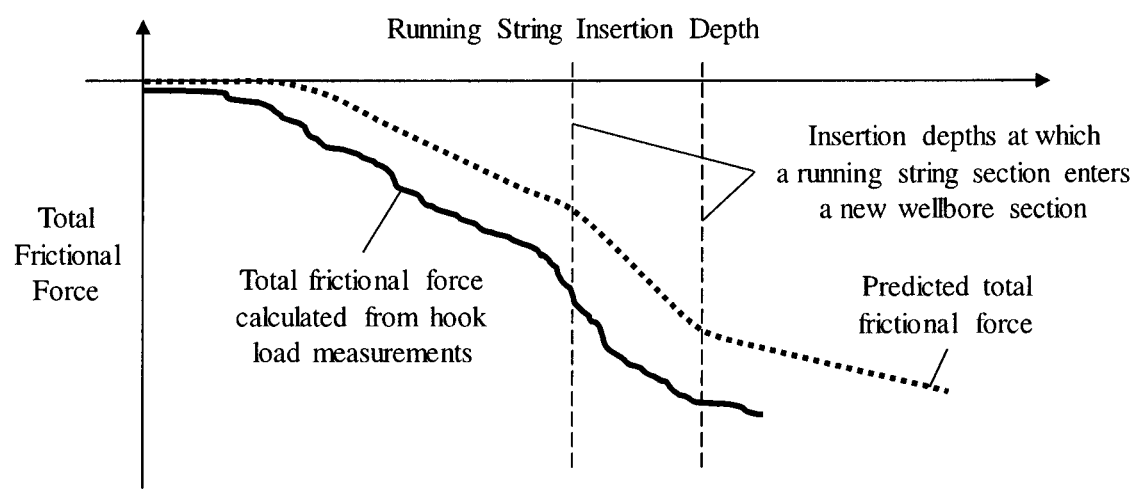
FIG. 14 illustrates an alternative embodiment of a display indicating total frictional force on a running string.

In one embodiment, the above-mentioned display indicates to the user any insertion depth at which a section of the running string enters a new section of the wellbore. Here, a "section" of the running string is defined as a length of the running string with consistent physical properties (e.g., pipe size and weight) that are distinct from the physical properties of neighbouring lengths. A "section" of the wellbore is similarly defined as a length of the wellbore with consistent physical properties that are distinct from the physical properties of neighbouring lengths. FIG. 14 shows an example of a display in which vertical lines are used to indicate any insertion depth at which a section of the running string enters a new section of the wellbore.

Fatigue Monitoring

The method described in the preceding sections is focused on preventing mechanical overload of running string components. As used in this specification, the term "mechanical overload" refers to a loading condition that is sufficient to damage, deform, or otherwise affect the operability of a running string component irrespective of the component's loading history. Another mechanism that can lead to the failure of running string components is fatigue. As used in this specification, the term "fatigue" refers to gradual damage to a running string component resulting from repeated or cyclic loading. Fatigue of running string components can occur at loads well below those required for mechanical overload.

The methods and systems described in the preceding sections of this disclosure can be extended to obtain an estimate of the fatigue damage to which running string components are subjected during a tubular running operation. In one embodiment, the TRO system estimates the fatigue damage accumulated by running string components using the following method:

TDA is performed in the top-down direction (i.e., using the axial load and torque measured at surface as the boundary conditions on the analysis) to estimate the axial load, torque, and side load on each component of the running string.

For each component of the running string, a stress state (or a strain state) is determined corresponding to the axial load, torque, and side load estimates obtained from TDA, plus pressure-induced or temperature-induced stresses (or strains) if appropriate. As used in this specification, the term "stress state" (or "strain state") refers to the spatial distribution of stress (or strain) in a component.

If the contribution of one or more load types to the stress state (or strain state) in a component can be deemed negligible, the stress state (or strain state) will depend only on the other load types. For example, if the contribution of side load to the stress state in a component is deemed negligible, then the stress state will depend only on the axial load and torque.

The preceding steps are repeated periodically over the course of the tubular running operation to obtain a time-varying stress state (or a time-varying strain state) for each component of the running string.

If a component of the running string experiences bending, a bending stress (or a bending strain) is added to the time-varying stress state (or a time-varying strain state) for that component.

In general, the bending stress (or bending strain) will be a function of both time and position within the component. The bending stress (or bending strain) will typically depend on the physical characteristics of the component (e.g., geometry and material properties), the curvature of the wellbore traversed by the component, and the kinematics of the running string.

Based on the time-varying stress state (or time-varying strain state), including any bending stress (or bending strain), the fatigue damage accumulated by each component of the running string is calculated using methods known to those of ordinary skill in the art.

Example

A tubular running operation involves rotation of a running string within a curved wellbore. The running string comprises simple tubular components defined by an inner radius, $r_{inner}$, an outer radius, $r_{outer}$, and a uniform cross-sectional area, $A = \pi(r_{outer}^2 - r_{inner}^2)$.

During the tubular running operation, the TRO system performs TDA in the top-down direction to estimate the axial load, torque, and side load on each component of the running string. For a given component i, the TRO system relates the estimated axial load, $F_i$, and estimated torque, $T_i$, to a corresponding stress state. Side load is neglected in the determination of the stress state, as it is deemed to have a negligible contribution.

In the current example, the simple geometry of the running string components means it is possible to determine the stress state in component i analytically. In a simple tubular component of uniform cross-section, axial load generates a uniform axial stress state:

$$\sigma_{i, axial\ load} = \frac{F_i}{A}$$

where $\sigma_{i, axial\ load}$ is the axial stress in component i from axial load;

$F_i$ is the axial load on component i; and

A is the cross-sectional area of component i.

Torque generates a shear stress whose magnitude increases with distance from the axis of the component:

$$\tau_i = \frac{T_i r}{J}$$

where $\tau_i$ is the shear stress in component i;

$T_i$ is the torque on component i;

r is the distance from the axis of component i to the point of consideration; and J is the polar moment of inertia of component i.

Over the course of the tubular running operation, the TRO system repeats the top-down TDA to obtain new estimates for the axial load, $F_i$, and torque, $T_i$, on component i. For each new estimate of axial load and torque, the TRO system determines a new stress state. The aggregation of all the stress states determined for component i up to the current point in the tubular running operation represents the time-varying stress state for component i, which can be expressed mathematically as:

$$\sigma_{i,axial\;load}(t) = \frac{F_i(t)}{A}$$

$$\tau_i(t) = \frac{T_i(t)r}{J}$$

where t denotes time and, for example, $F_i(t)$ denotes the axial load on component i as a function of time.

Figure 15:
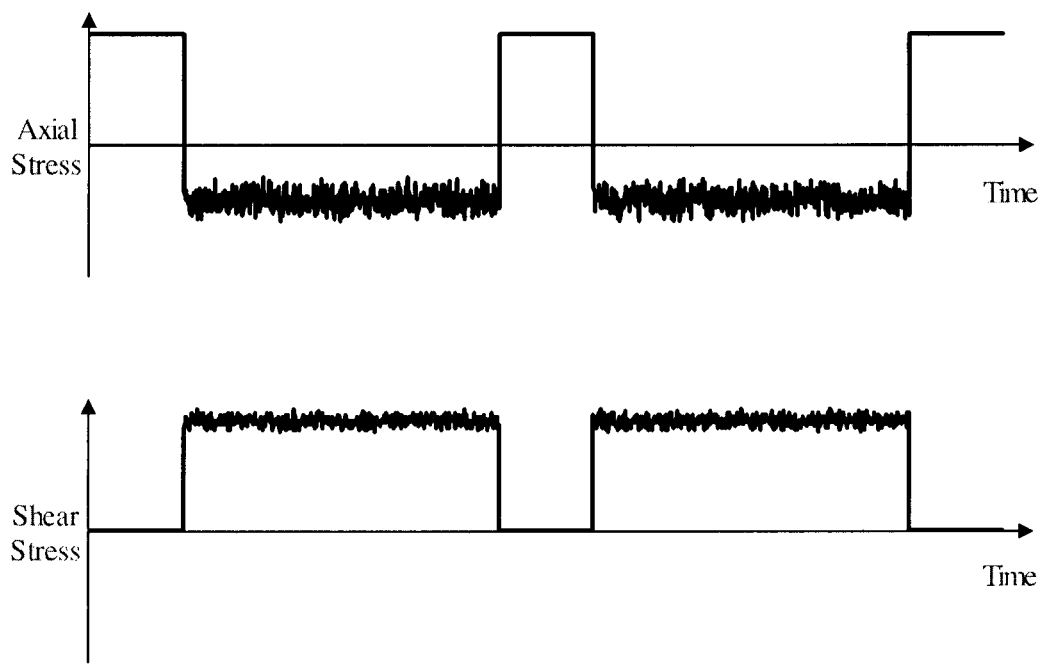
FIG. 15 is an illustrative example of axial stresses and shear stresses acting on a running string component.

The axial stress from axial load and maximum shear stress (obtained by evaluating the shear stress equation above at $r=r_{outer}$) in a sample component of the running string are plotted against time in FIG. 15. The axial and shear stresses demonstrate high-frequency variations resulting from numerous causes, including changes in the torque-and-drag conditions, dynamic effects, and noise in the sensor readings. The axial and shear stresses also demonstrate low-frequency variations resulting from the start-and-stop nature of the tubular running process (i.e., after a joint of pipe is run into the hole, the running string must be held stationary while the next joint is connected).

In cases involving curvature, the time-varying stress state determined from the estimated axial load, $F_i$, and estimated torque, $T_i$, is incomplete for the purpose of calculating fatigue damage because curvature induces additional bending stresses in the running string. Therefore, the TRO system adds a bending stress to the time-varying stress state for component i. In simple tubular components, curvature induces an axial stress whose magnitude increases with distance from the neutral bending axis:

$$\sigma_{i,curvature}(t) = E\frac{y(t)}{\rho_i(t)}$$

where $\sigma_{i,curvature}$ is the axial stress in component i from curvature;
E is the elastic modulus of the component i;
y is the distance from the neutral bending axis to the point of consideration; and
$\rho_i$ is the radius of curvature of component i.

As used in this specification, the term "neutral bending axis" refers to the axis along which curvature induces no axial stress or strain. On one side of the neutral bending axis, the stress and strain from curvature are tensile; on the other side, the stress and strain from curvature are compressive. In the current example, rotation of the running string causes rotation of the neutral bending axis when viewed from a frame of reference fixed to the running string. Consequently, the distance from the neutral bending axis to the point of consideration, y, varies with time. The complete time-varying stress state for component i is thus:

$$\sigma_i(t) = \sigma_{i,axial\;load}(t) + \sigma_{i,curvature}(t) = \frac{F_i(t)}{A} + E\frac{y(t)}{\rho_i(t)}$$

$$\tau_i(t) = \frac{T_i(t)r}{J}$$

Figure 16:
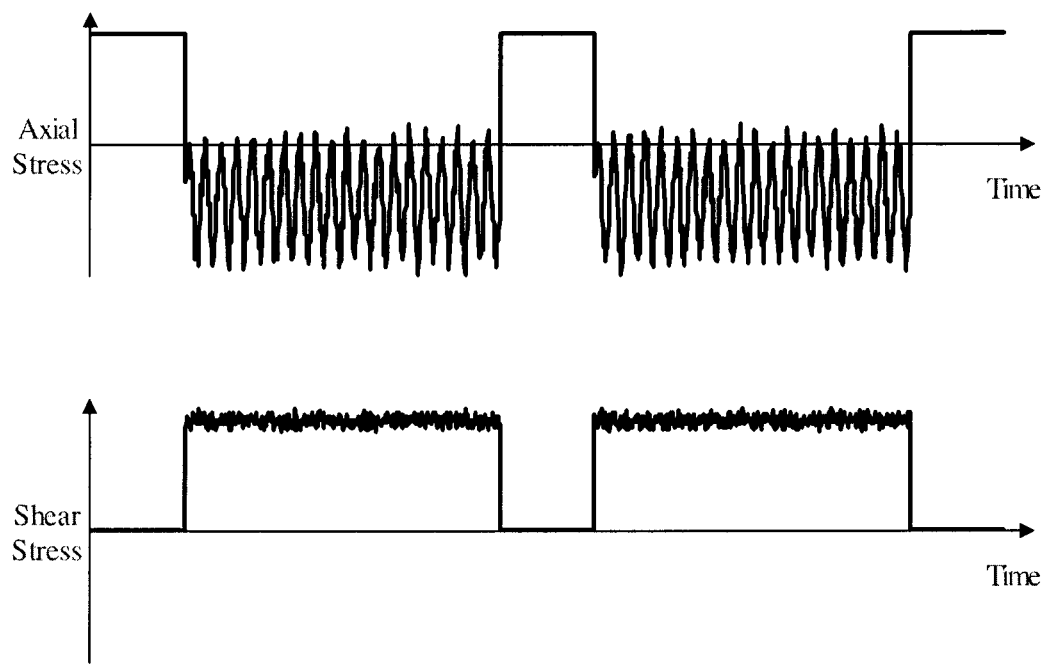
FIG. 16 is illustrative example of axial stresses and shear stresses acting on a running string component, including bending effects.

The total axial stress (including bending) and maximum shear stress in a sample component of the running string are plotted against time in FIG. 16. In addition to the low-frequency and high-frequency variations discussed previously, the total axial stress demonstrates periodic variations resulting from rotation of the running string within the curved wellbore.

After determining the complete time-varying stress state for each component of the running string, the TRO system estimates the fatigue damage accumulated by each component using methods known to those of ordinary skill in the art. The TRO system updates the fatigue damage estimates periodically over the course of the tubular running operation.

In the current example, it is determined that alternating axial stresses resulting from rotating bending are the primary driver of fatigue damage. The following well-known methods for estimating fatigue damage are employed:

The time-varying stress state for component i is divided into time intervals.

Within each interval, the stress state in component i is related to an equivalent alternating bending stress and an equivalent mean bending stress. The equivalent alternating bending stress is taken as the maximum axial stress from curvature:

$$\sigma_{i,alternating} = \sigma_{i,curvature,max} = E\frac{r_{outer}}{\rho_i}$$

The equivalent mean bending stress is taken as the maximum principal stress resulting from the superposition of the axial stress from axial load and the maximum shear stress from torque:

$$\sigma_{i,mean} = \frac{\sigma_{i,axial\;load}}{2} + \sqrt{\tau_{i,max}^2 + \left(\frac{\sigma_{i,axial\;load}}{2}\right)^2} = \frac{F_i}{2A} + \sqrt{\left(\frac{T_i r_{outer}}{J}\right)^2 + \left(\frac{F_i}{2A}\right)^2}$$

Within each interval, the number of loading cycles until fatigue failure is estimated from a stress-cycle (S-N) curve, using the Goodman method to account for the effect of mean stress.

The fraction of the fatigue life of component i consumed up to the current point in the tubular running operation is calculated using Miner's rule, which assumes linear damage accumulation:

$$f_i = \sum_{j=1}^{j=k} \frac{n_i^j}{N_i^j}$$

where $f_i$ is the fraction of the fatigue life of component i consumed;
$n_i^j$ is the number of loading cycles experienced by component i in interval j;

$N_i^j$ is the estimated number of cycles to failure for component i in interval j; and k is the total number of intervals.

Embodiments

As described earlier herein, TRO systems in accordance with the present disclosure consider two distinct running string load distributions. The first load distribution is the output of TDA, and is termed the virtual load distribution. The second load distribution is obtained by eliminating any non-physical features of the virtual load distribution, and is termed the consistent load distribution. In preferred but optional embodiments, the TRO system uses the consistent load distribution to estimate fatigue damage accumulation.

In the preceding example, the TRO system determined a single time-varying stress state for each component of the running string and, in turn, a single estimate of the fatigue damage accumulated by each component. In an alternative embodiment, the method is repeated multiple times to obtain multiple time-varying stress states for each component and multiple estimates of the fatigue damage accumulated. Each fatigue damage estimate is based on a different set of analysis inputs, selected to describe the full range of downhole conditions possible within the measurement and modelling uncertainties specified by the user. In one embodiment of the TRO system, nominal, pessimistic, and optimistic fatigue life estimates are reported to the user. In another embodiment, the user assigns a probability distribution to one or more analysis inputs, and a corresponding probability distribution is associated with the resulting fatigue damage estimates.

In the preceding example, fatigue damage was calculated using stress-based methods. In alternative embodiments of the TRO system, time-varying strain states are determined for the components of the running string, and fatigue damage is estimated using strain-based methods.

For some types of running string components, it is possible to determine the stress state (or the strain state) corresponding to a given axial load, torque, side load, and curvature using analytical methods. For other types of components, more complex methods (e.g., finite element analysis) may be required.

Oilfield experience indicates that fatigue failures are most likely to occur at the threaded connections between pipe joints, which can be attributed to the presence of stress and strain concentrations within the connections. In one embodiment, the TRO system estimates the fatigue damage accumulated by each connection in the running string in accordance with methods described in this specification based on (1) the stress state in the neighbouring pipe body and (2) a stress concentration factor to account for the localization of stress within the connections.

The fatigue damage sustained by a running string component during a tubular running operation may contribute to its failure in a subsequent stage of the life of the well. For example, in wells that are hydraulically stimulated, fatigue damage accumulated by the casing connections during running may reduce the capacity of the connections to withstand cyclic pressure loading during the hydraulic stimulation process. The estimates of remaining fatigue life provided by the TRO system may be used as the basis for determining safe operational loads in subsequent stages of the well life.

In engineering contexts, the term "fatigue failure" is commonly associated with catastrophic structural failure of an engineering component. However, the systems and methods described in this specification can be applied to any application involving cumulative damage of the running string, whether or not catastrophic structural failure is the primary concern. For example, cyclic loading of threaded casing connections during a tubular running operation could conceivably affect the ability of the connections to provide a seal (i.e., to provide a barrier to the flow of wellbore fluids). Determining time-varying loads and associated stress (or strain) states for the threaded connections in a running string, in accordance with the methods described in this specification, provides a basis for assessing the effect of running loads on both the mechanical integrity and sealing performance of the connections.

Wear Monitoring

Contact between the running string and the wellbore during a tubular running operation can result in the gradual removal of material from the contacting surfaces. This phenomenon, hereafter referred to as "wear", depends on many variables, including but not limited to the magnitude of the contact forces, the velocity of the running string, the duration of the tubular running operation, the lubricity of the fluid in the wellbore, and the wear resistance of the surfaces involved.

Conceptually, both the running string and the wellbore experience wear during a tubular running operation. Oilfield experience indicates that wear of the wellbore tends to be concentrated at specific locations where the contact forces are largest owing to the curvature of the well trajectory. Wear of the running string is an important consideration when contact forces are concentrated on specific running string components (e.g., the centralizers on a centralized casing string).

As discussed previously in this specification, the outputs of the top-down TDA performed by a TRO system include an estimate of the side load on each component of the running string. These side load estimates represent the contact forces between the running string and the wellbore, and therefore provide a basis for estimating the wear experienced by the running string or wellbore during a tubular running operation.

In one embodiment, the TRO system provides an estimate of the wear experienced by the wellbore using the following method:

The wellbore is divided axially into numerous elements for analysis.

TDA is performed in the top-down direction to estimate the side load distribution along the length of the running string; the magnitude of the contact force on each wellbore element is equal to the magnitude of the side load.

The contact force on each wellbore element is recorded, along with the current running string velocity, which is calculated based on the running rate and rotation rate measured at surface.

In cases involving rotation of the running string, the magnitude of the vector sum of the axial and rotational velocities at the outer surface of the running string is recorded.

The preceding two steps are repeated periodically over the course of the tubular running operation to obtain the time-varying contact force on each wellbore element and the time-varying running string velocity.

Based on the time-varying contact force and time-varying running string velocity, the wear accumulated by each wellbore element is estimated using methods known to those of ordinary skill in the art (with one exemplary method being described below).

In another embodiment, the TRO system estimates the wear experienced by components in the running string using a method analogous to that described above, wherein the time-varying contact force and velocity are recorded for each running string component (rather than each wellbore element).

The wear experienced by a given element of the wellbore or component in the running string can be estimated using an equation of the form:

$$W = \frac{K}{H} F_{contact} S$$

where W is the volume of material worn away;
K is a dimensionless parameter commonly called the wear coefficient;
H is the surface hardness;
$F_{contact}$ is the contact force magnitude; and
S is the rubbing distance.

In the above equation, the contact force, $F_{contact}$, is a direct output of TDA. The rubbing distance, S, can be obtained through integration of the running string velocity with respect to time. Owing to the time-dependence of both the contact force and the running string velocity, the above equation is typically solved through numerical integration.

It will be readily appreciated by those skilled in the art that various modifications of systems and methods in accordance with the present disclosure may be devised without departing from the scope and teachings of the disclosure. It is to be especially understood that the subject systems and methods are not intended to be limited to any described or illustrated embodiment, and that the substitution of a variant of a claimed element or feature, without any substantial resultant change in the working of the systems or methods, will not constitute a departure from the scope of the disclosure.

In this patent document, any form of the word "comprise" is to be understood in its non-limiting sense to mean that any element or feature following such word is included, but elements or features not specifically mentioned are not excluded. A reference to an element or feature by the indefinite article "a" does not exclude the possibility that more than one such element or feature is present, unless the context clearly requires that there be one and only one such element or feature.

Wherever used in this document, the terms "typical" and "typically" are to be interpreted in the sense of representative or common usage or practice, and are not to be understood as implying invariability or essentiality.

The embodiments in which an exclusive property or privilege is claimed are defined as follows:

1. A method for optimizing a tubular running operation in which a running string is disposed in a wellbore at a wellsite, said method comprising the steps of:
   (a) obtaining measurements of a plurality of running string parameters from a plurality of sensors located at the wellsite, wherein said plurality of running string parameters includes an insertion depth of the running string, a running rate of the running string, and a load acting at the top of the running string, wherein said load acting at the top of the running string includes an axial component;
   (b) performing torque-and-drag analysis in the top-down direction, by means of one or more processors, using the insertion depth, running rate, and load measurements obtained in step (a) as inputs for the torque-and-drag analysis, to calculate an estimated load on each of a plurality of user-selected components of the running string;
   (c) calculating, by means of the one or more processors, a local load limit envelope for each user-selected component of the running string based on each user-selected component's current location in the wellbore;
   (d) for each user-selected component of the running string, calculating, by means of the one or more processors, a surface load limit envelope based on the local load limit envelope of the component and the estimated load on the component;
   (e) calculating, by means of the one or more processors, a composite surface load limit envelope as the intersection of the surface load limit envelopes of all user-selected components in the running string; and
   (f) adjusting the load acting at the top of the running string so that the load acting at the top of the running string remains within the composite surface load limit envelope.

2. The method as in claim 1 wherein steps (a) to (f) in claim 1 are repeated at selected periodic intervals.

3. The method as in claim 1 wherein the method for calculating the surface load limit envelope of a given user-selected component of the running string comprises the steps of:
   (a) calculating a surface load adjustment as the difference between the measured load acting at the top of the running string and the estimated load on the component; and
   (b) calculating the surface load limit envelope of the component as the sum of the local load limit envelope of the component and the surface load adjustment.

4. The method as in claim 1 wherein the estimated load on a given user-selected component of the running string is assumed to be a virtual load corresponding to the direct output of the torque-and-drag analysis without correction for non-physical results.

5. The method as in claim 1 wherein the local load limit envelope for a given user-selected component of the running string comprises a locus of axial loads and torques.

6. The method as in claim 1 wherein the local load limit envelope for a given user-selected component of the running string is a pessimistic local load limit envelope calculated by the steps of:
   (a) performing torque-and-drag analysis in the top-down direction for a range of inputs to obtain a range of possible loads on the component within user-specified measurement and modelling uncertainties; and
   (b) calculating the pessimistic local load limit envelope as the largest load limit envelope that contains any nominal load estimate such that the entire range of possible loads is contained within a true local load limit envelope of the component.

7. The method as in claim 1, further comprising the step of calculating a load ratio for each user-selected component of the running string as the estimated load on that component divided by the local load limit of that component in the direction of loading.

8. The method as in claim 1 wherein the torque-and-drag analysis is repeated for a range of inputs to determine a range of possible loads on each user-selected component of the running string within user-specified measurement and modelling uncertainties.

9. The method as in claim 1, further comprising the steps of:
(a) measuring one or more of the pressure, the flow rate, and the temperature of a fluid in the wellbore; and
(b) incorporating fluid-induced loading in the estimated load on each user-selected component of the running string.

10. The method as in claim 1 further comprising one or more steps selected from the group consisting of:
(a) changing the running rate of the running string;
(b) changing the a rotation rate of the running string;
(c) adding a lubricant to the wellbore;
(d) adding centralizers to the running string; and
(e) pulling the running string out of the wellbore to perform wellbore cleaning.

11. The method as in claim 1 wherein:
(a) the running string is a rotating running string;
(b) the plurality of running string parameters includes a rotation rate of the running string; and
(c) the load acting at the top of the running string includes a torque component.

12. The method as in claim 1 wherein one or more of the measurements of running string parameters are made indirectly.

13. A method for optimizing a tubular running operation in which a running string is disposed in a wellbore at a wellsite, said method comprising the steps of:
(a) performing torque-and-drag analysis in the bottom-up direction to calculate, by means of one or more processors, an estimated running string load distribution, including a predicted load acting at the top of the running string, at a user-specified future running string insertion depth;
(b) calculating, by means of the one or more processors, a local load limit envelope for each of a plurality of user-selected components of the running string based on each user-selected component's future location in the wellbore for the userspecified future running string insertion depth;
(c) for each user-selected component of the running string, calculating, by means of the one or more processors, a surface load limit envelope based on the local load limit envelope of the component and the estimated load on the component as indicated by the estimated running string load distribution;
(d) calculating, by means of the one or more processors, a composite surface load limit envelope as the intersection of the surface load limit envelopes of all user-selected components in the running string; and
(e) adjusting the predicted load acting at the top of the running string so that the predicted load acting at the top of the running string remains within the composite surface load limit envelope.

14. The method as in claim 13 wherein steps (a) to (e) in claim 13 are repeated at selected periodic intervals.

15. The method as in claim 13 wherein the method for calculating the surface load limit envelope of a given component of the running string comprises the steps of:
(a) calculating a surface load adjustment as the difference between the predicted load acting at the top of the running string and the estimated load on the component; and
(b) calculating the surface load limit envelope of the component as the sum of the local load limit envelope of the component and the surface load adjustment.

16. The method as in claim 13 wherein the local load limit envelope of each user-selected component of the running string comprises a locus of axial loads and torques.

17. The method as in claim 13 wherein the torque-and-drag analysis is repeated for a range of inputs to determine a range of possible loads on each user-selected component of the running string within user-specified modelling uncertainties.

18. The method as in claim 13 wherein the axial load and torque at the bottom of the running string are assumed to be zero in the torque-and-drag analysis.

19. The method as in claim 13 wherein either a non-zero axial load or a non-zero torque is assumed at the bottom of the running string in the torque-and-drag analysis.

20. The method as in claim 13 wherein the predicted load acting at the top of the running string is adjusted by taking one or more steps selected from the group consisting of:
(a) changing a running rate of the running string;
(b) changing a rotation rate of the running string;
(c) adding a lubricant to the wellbore;
(d) adding centralizers to the running string; and
(e) pulling the running string out of the wellbore to perform wellbore cleaning.

* * * * *